United States Patent
Umemoto et al.

(10) Patent No.: US 8,382,919 B2
(45) Date of Patent: Feb. 26, 2013

(54) PROCESS OF FORMING NANOCRYSTAL LAYER

(75) Inventors: Minoru Umemoto, Toyohashi (JP); Yoshikazu Todaka, Toyohashi (JP); Tadashi Suzuki, Kosai (JP); Toshiichi Ota, Kosai (JP); Akihiro Yamashita, Kosai (JP); Shuji Tanaka, Kosai (JP)

(73) Assignees: Toyohashi University of Technology, Aichi (JP); Univance Corporation, Shizuoka (JP)

( * ) Notice: Subject to any disclaimer, the term of this patent is extended or adjusted under 35 U.S.C. 154(b) by 483 days.

(21) Appl. No.: 12/590,576

(22) Filed: Nov. 10, 2009

(65) Prior Publication Data

US 2010/0151270 A1 Jun. 17, 2010

Related U.S. Application Data

(63) Continuation of application No. 10/585,707, filed as application No. PCT/JP2004/018650 on Dec. 14, 2004.

(30) Foreign Application Priority Data

| Jan. 21, 2004 | (JP) | 2004-013487 |
| Aug. 20, 2004 | (JP) | 2004-240615 |
| Aug. 20, 2004 | (JP) | 2004-240616 |

(51) Int. Cl.
*C21D 6/00* (2006.01)

(52) U.S. Cl. ........ 148/656; 428/553; 428/615; 427/444; 148/648; 29/527.4

(58) Field of Classification Search .................. 148/656
See application file for complete search history.

(56) References Cited

U.S. PATENT DOCUMENTS

| 3,117,042 A | 1/1964 | Blechner |
| 5,881,594 A | 3/1999 | Hughes et al. |

FOREIGN PATENT DOCUMENTS

| CN | 1377987 | 11/2002 |
| DE | 880 446 | 6/1953 |
| DE | 198 48 033 | 1/2000 |
| GB | 884 446 | 12/1961 |
| GB | 884 447 | 12/1961 |
| JP | 2001-138113 | 5/2001 |
| JP | 2003-039398 | 2/2003 |
| JP | 2003-522030 | 7/2003 |
| JP | 2004-169099 | 6/2004 |
| JP | 2005-069377 | 3/2005 |
| JP | 2006-312202 | 11/2006 |

OTHER PUBLICATIONS

Minoru Umemoto "Forming Nano-Crystal for Strengthening Steel Material" Kikai to Kogu, Jun. 2004.
Brinkseier et al. "Werkstoffgerechte Fertigugn", Carl Hanser Verlag, vlo.58, No. 6, 2003, pp. 336-343. Zurita et al. "Superficial Hardening in the Plane Grinding of ALSL 1045 Steel", Journal of Materials Engineering and Performance, ASM International, vol. 12, No. 3, Jun. 2003.

*Primary Examiner* — Roy King
*Assistant Examiner* — Christopher Kessler
(74) *Attorney, Agent, or Firm* — Muramatsu & Associates

(57) ABSTRACT

A process of forming an ultrafine crystal layer in a workpiece constituted by a metallic material. The process includes: performing a machining operation on a surface of the workpiece, so as to impart a large local strain to the machined surface of the workpiece, where the machining operation causes the machined surface of the workpiece to be subjected to a plastic working that causes to have large local strain in the form of a true strain of at least one, such that the ultrafine crystal layer is formed in a surface layer portion of the workpiece that defines the machined surface of the workpiece. Also disclosed are a nanocrystal layer forming process, a machine component having the ultrafine crystal layer or the nanocrystal layer, and a machine component producing process of producing the machine component.

10 Claims, 16 Drawing Sheets

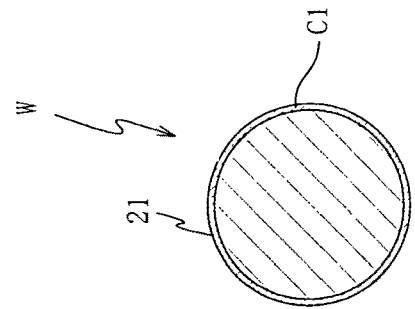
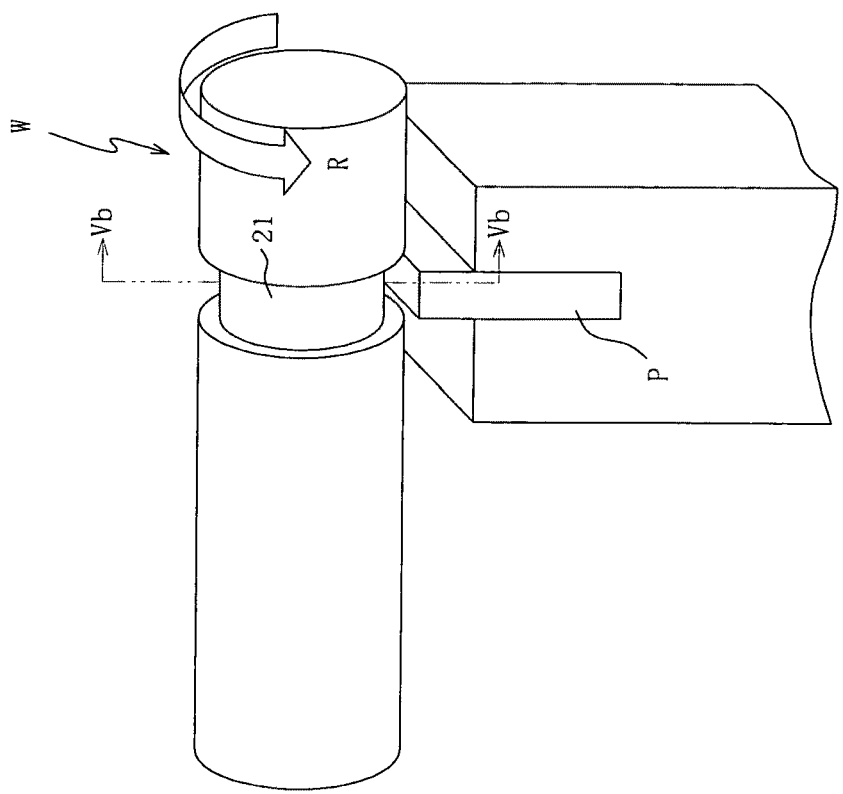

PROCESS OF FORMING NANOCRYSTAL LAYER

CROSS-REFERENCE TO RELATED APPLICATION

This application is a continuation of prior U.S. patent application Ser. No. 10/585,707, filed Jul. 10, 2006, which is a national stage of International Application No. PCT/JP2004/018650, filed Dec. 14, 2004.

TECHNICAL FIELD

The present invention relates to a process of forming an ultrafine crystal layer, a machine component having the ultrafine crystal layer formed by the ultrafine crystal layer forming process, and a process of producing the machine component, and also relates to a process of forming a nanocrystal layer, a machine component having the nanocrystal layer formed by the nanocrystal layer forming process, and a process of producing the machine component.

BACKGROUND ART

In recent years, it has been revealed that formation of an ultrafine crystal layer or a nanocrystal layer in a surface layer portion of a metallic material could cause the material to have excellent characteristics that had not existed before.

The ultrafine crystal layer refers to a layer with crystal grains each having a size of from 100 nm to 1 μm, while the nanocrystal layer refers to a layer with crystal grains each having a size of not larger than 100 um. The ultrafine crystal layer has characteristics suitable for a machine component, such as its hardness higher than that of its base material and its high compressive residual stress. Similarly, the nanocrystal layer has characteristics suitable for a machine component, such as its hardness much higher than that of its base material, its difficulty of grain growth even at a high temperature and its high compressive residual stress.

It is expected that, if the ultrafine crystal layer and the nanocrystal layer could be utilized for industries, a product constituted by a metallic material could have improved strength and performance.

Thus, there are proposed various techniques for forming the ultrafine crystal layer and the nanocrystal layer (hereinafter referred to as "nanocrystal layer or the like") in a surface layer portion of a metallic material. For example, in JP-2003-39398A, there is proposed a technique for causing a protrusion formed in a distal end surface of a metal weight, to collide with a portion of a surface of a metallic product, so as to form the nanocrystal layer or the like in the portion of the surface of the metallic product.

Further, as another conventional technique, there is a technique using a shot peening. FIG. 16 is a schematic view showing the shot peening. This shot peening is, as shown in FIG. 16, arranged to cause hard particles G such as steels and ceramics to collide with a portion of a working surface 101a of a metallic material 101 at a high velocity, by using an ejection pressure of a compressive air ejected from an ejection device 100. The collision causes the portion of the working surface 101a to be plastically deformed, and accordingly forms the nanocrystal layer or the like in the portion of the working surface 101a.

DISCLOSURE OF INVENTION

Problem to be Solved by the Invention

However, in the above-described technique for colliding with the protrusion of the metal weight, for example, where the nanocrystal layer or the like is to be formed in a surface of a corner portion or in an inner circumferential surface of a hole, the protrusion of the metal weight cannot be caused to collide with such a surface, so that the nanocrystal layer or the like cannot be formed in the surface. Thus, there is a problem that the technique is difficult to be applied to an actual industrial product having a complicated shape.

Further, the above-described conventional techniques additionally require special installations such as a collision device for the metal weight and the ejection device 100 for the hard particles G, thereby problematically increasing a cost required for the installations, also require additional steps using such devices, thereby problematically increasing a forming cost (cost required for forming the nanocrystal layer or the like).

Further, in the technique for colliding with the protrusion of the metal weight, since an area of the nanocrystal layer or the like that can be formed by a single collision is narrow, the collision has to be repeated a plurality of times, thereby increasing a required forming time and accordingly increasing a forming cost (cost required for forming the nanocrystal layer or the like) as a result of the increase of the required forming time.

Further, in the above-described conventional techniques, since the nanocrystal layer or the like is formed owing to the plastic deformation of the surface of the product with which the protrusion or the hard particles G are caused to collide, the formed surface of the nanocrystal layer or the like is made rough, and cannot be provided by a smoothly finished surface. In addition, there is another problem that the nanocrystal layer or the like cannot be homogeneous in its entirety.

For example, in the technique for colliding with the protrusion of the metal weight, there is a difference, between a center portion and a peripheral portion of the protrusion, with respect to a collision pressure acting on the product surface. This difference causes the nanocrystal layer formed in the collision surface of the product, to be uneven in a radial direction of the protrusion, with respect to its thickness and characteristics. Further, in the technique using the shot peening, the hard particles G can not be caused to collide evenly with an entirety of the inner circumferential surface of the hole, so that the nanocrystal layer is likely to be concentrated in a portion of the inner circumferential surface that is adjacent to an opening of the hole, rather than in a portion of the inner circumferential surface that is adjacent to a bottom of the hole.

Meanwhile, in recent years, there has been proposed also a technique for obtaining the nanocrystal layer or the like, by a strengthening operation such as rolling and drawing. However, since this technique is for strengthening a raw material, there is a problem that an effect of hardening is lost by a heat treatment that is carried out after the strengthening operation such as the rolling or the like, and there is another problem that the cost is increased due to necessity of special installations and an operation of the heat treatment. Consequently, this technique is difficult to be applied to an actual industrial product.

On the other hand, the present inventors, as an outcome of their assiduous studies of the above-described problems, proposed a technique for forming the nanocrystal layer or the like that is configured to have a shape of the product, by a machining operating such as drilling operation (in Japanese Patent Applications No. 2003-300354 and No. 2004-13487, either of which has not been yet laid open), and enabled an industrial use of the nanocrystal layer or the like. However, in this technique, the machined surface is given a high distortion while a material temperature of the machined surface is being held low. Therefore, where the machining is performed on a workpiece of a material having a high hardness, a load exerted on a machining tool is increased. Thus, in this technique, there is a problem that the tool could be broken or a problem that the machining operation could not be carried out.

The present invention was developed for solving the above-described problems, and has an object to provide an ultrafine crystal layer forming process capable of stably producing an ultrafine crystal layer in a surface of a metallic product at a low cost, a machine component having the ultrafine crystal layer formed by the ultrafine crystal layer forming process, and a process of producing the machine component, and also relates to a nanocrystal layer forming process, a machine component having the nanocrystal layer formed by the nanocrystal layer forming process, and a process of producing the machine component.

Measures for Achieving the Object

For achieving the object, a first aspect of the invention defines an ultrafine crystal layer forming process of forming an ultrafine crystal layer in a surface layer portion of a surface of a workpiece constituted by a metallic material, by performing a machining operation on the surface of the workpiece using a machining tool, so as to impart a large local strain to the machined surface of the workpiece, wherein the machining operation using the machining tool causes the machined surface of the workpiece to be subjected to a plastic working that causes the machined surface of the workpiece to have a true strain of at least 1.

According to a second aspect of the invention, in the ultrafine crystal layer forming process defined in the first aspect of the invention, the machining operation using the machining tool is performed with a material temperature at the machined surface of the workpiece being held lower than a predetermined upper limit temperature, wherein the predetermined upper limit temperature is, where the workpiece is constituted by a steel material, an Ac1 transformation point of the steel material, and wherein the predetermined upper limit temperature is, where the workpiece is constituted by the metallic material other than the steel material, substantially half a melting point of the metallic material as expressed in terms of absolute temperature.

According to a third aspect of the invention, in the ultrafine crystal layer forming process defined in the first aspect of the invention, the machining operation using the machining tool is performed with a material temperature at the machined surface of the workpiece being held within a predetermined temperature range, wherein the predetermined temperature range is, where the workpiece is constituted by a steel material, not lower than an Ac1 transformation point of the steel material and is lower than a melting point of the steel material, and wherein the predetermined temperature range is, where the workpiece is constituted by the metallic material other than the steel material, not lower than substantially half a melting point of the metallic material as expressed in terms of absolute temperature and is lower than the melting point of the metallic material.

According to a fourth aspect of the invention, in the ultrafine crystal layer forming process defined in the third aspect of the invention, where the workpiece is constituted by the steel material, after the machining operation using the machining tool has been performed, the machined surface of the workpiece is cooled at a rate higher than a cooling rate that is required for hardening the workpiece.

According to a fifth aspect of the invention, in the ultrafine crystal layer forming process defined in any one of the second through fourth aspects of the invention, the machining operation using the machining tool is performed, such that a material temperature at the machined surface of the workpiece is held lower than the predetermined upper limit temperature or held within the predetermined temperature range, and such that a material temperature at a non-ultrafine crystal layer which is provided by a lower layer portion of the machined surface or which is provided by a surface layer portion in neighborhood of the machined surface is held at least about 500° C. for a length of time that is not larger than about 1 second, for providing the non-ultrafine crystal layer with a hardness that is about 80% as high as a hardness of a substrate of the workpiece.

A sixth aspect of the invention defines a machine component constituted by a metallic material and having a surface layer portion, wherein the surface layer portion is at least partially provided by an ultrafine crystal layer formed by the ultrafine crystal layer forming process defined in any one of the first through fifth aspects of the invention.

A seventh aspect of the invention defines a machine component producing process of producing a machine component constituted by a metallic material and having a surface layer portion that is at least partially provided by an ultrafine crystal layer, wherein the process includes at least an ultrafine crystal layer forming step of forming the ultrafine crystal layer in the machine component by the ultrafine crystal layer forming process defined in any one of the first through fifth aspects of the invention.

An eighth aspect of the invention defines a nanocrystal layer forming process of forming a nanocrystal layer in a surface layer portion of a surface of a workpiece constituted by a metallic material, by performing a machining operation on the surface of the workpiece using a machining tool, so as to impart a large local strain to the machined surface of the workpiece, wherein the machining operation using the machining tool causes the machined surface of the workpiece to be subjected to a plastic working that causes the machined surface of the workpiece to have a true strain of at least 7, and is performed with a material temperature at the machined surface of the workpiece being held within a predetermined temperature range, wherein the predetermined temperature range is, where the workpiece is constituted by a steel material, not lower than an Ac1 transformation point of the steel material and is lower than a melting point of the steel material, and wherein the predetermined temperature range is, where the workpiece is constituted by the metallic material other than the steel material, not lower than substantially half a melting point of the metallic material as expressed in terms of absolute temperature and is lower than the melting point of the metallic material.

According to a ninth aspect of the invention, in the nanocrystal layer forming process defined in the eighth aspect of the invention, wherein the machining operation using the machining tool is performed, such that a material temperature at the machined surface of the workpiece is held within the predetermined temperature range, and such that a material temperature at a non-nanocrystal layer which is provided by a lower layer portion of the machined surface or which is provided by a surface layer portion in neighborhood of the machined surface is held at least about 500° C. for a length of time that is not larger than about 1 second, for providing the nanocrystal layer with a hardness that is about 80% as high as a hardness of a substrate of the workpiece.

A tenth aspect of the invention defines a nanocrystal layer forming process of forming a nanocrystal layer as a fine crystal grain layer in a surface of a workpiece constituted by a metallic material, wherein the process includes performing a machining operation on the surface of the workpiece using a machining tool, so as to impart a large local strain to the machined surface of the workpiece, for forming the nanocrystal layer in a surface layer portion of the machined surface of the workpiece.

According to an eleventh aspect of the invention, in the nanocrystal layer forming process defined in the tenth aspect of the invention, wherein the machining operation using the machining tool causes the machined surface of the workpiece to be subjected to a plastic working that causes the machined surface of the workpiece to have a true strain of at least 7, and is performed with a material temperature at the machined surface of the workpiece being held not higher than a predetermined upper limit temperature, wherein the predetermined upper limit temperature is, where the workpiece is constituted by a steel material, A1 and A3 transformation points of the steel material, and wherein the predetermined upper limit temperature is, where the workpiece is constituted by the metallic material other than the steel material, substantially half a melting point of the metallic material as expressed in terms of absolute temperature.

According to a twelfth aspect of the invention, in the nanocrystal layer forming process defined in the eleventh aspect of the invention, the material temperature at the machined surface of the workpiece is held such that an overall time-based average value of the material temperature during the machining operation and an overall surface-based average value of the material temperature in an entirety of the machined surface over which a heat is distributed are not higher than the predetermined upper limit temperature.

According to a thirteenth aspect of the invention, in the nanocrystal layer forming process defined in any one of the eighth through twelfth aspects of the invention, wherein the machining operation using the machining tool is performed such that a strain gradient of at least $1/\mu m$ is imparted to the surface layer portion of the machined surface.

A fourteenth aspect of the invention defines a machine component constituted by a metallic material and having a surface layer portion, wherein the surface layer portion is at least partially provided by a nanocrystal layer formed by the nanocrystal layer forming process defined in any one of the eighth through thirteenth aspects of the invention.

A fifteenth aspect of the invention defines a machine component producing process of producing a machine component constituted by a metallic material and having a surface layer portion that is at least partially provided by a nanocrystal layer, wherein the process included at least a nanocrystal layer forming step of forming the nanocrystal layer in the machine component by the nanocrystal layer forming process defined in any one of the eighth through thirteenth aspects of the invention.

Effects of the Invention

In the ultrafine crystal layer forming process defined in the first aspect of the invention, since the ultrafine crystal layer is formed in the surface layer portion of the machined surface by performing the machining operation using the machining tool, it is possible to restrain the problems, encountered in the conventional techniques, that portions of a workpiece in which the ultrafine crystal layer can be formed are limited depending upon a shape of the workpiece and that the thickness and characteristics of the ultrafine crystal layer are not uniform, Consequently, the ultrafine crystal layer forming process provides an effect that makes it possible to stably form the ultrafine crystal layer forming process in the workpiece such as a machine component.

Further, unlike in the conventional techniques, there is no need of additional provision of special installations such as a collision device for a metal weight and an ejection device for shot peening, thereby making it possible to restrain a cost required for the installations. Further, in a product producing process, it is possible to minimize modifications of the process required for formation of the ultrafine crystal layer, leading to reduction in a cost required for the formation of the ultrafine crystal layer and the consequent reduction in a cost required for the production of the product.

Further, in the conventional techniques, where the ultrafine crystal layer is to be formed over a wide area, the collision of the protrusion or the hard particles has to be repeated a plurality of times, thereby increasing a required forming time and resulting in inefficiency in the formation of the ultrafine crystal layer. On the other hand, in the ultrafine crystal layer forming process defined in the first aspect of the invention, since the ultrafine crystal layer is formed by performing the machining operation using the machining tool, it is possible to efficiently form the ultrafine crystal layer, leading to the consequent reduction in the cost for the formation of the ultrafine crystal layer.

Further, since the machining operation using the machining tool causes the machined surface of the workpiece to be subjected to a plastic working that causes the machined surface of the workpiece to have the true strain of at least 1, there is an effect that restrains a load exerted on the machining tool and a machine in which the machining operation is performed. Consequently, even where the workpiece to be machined is constituted by a material having a high hardness, it is possible to restrain breakage of the machining tool, thereby providing an effect that enables the ultrafine crystal layer to be stably formed in the surface layer portion of the machined surface of the workpiece.

In the ultrafine crystal layer forming process defined in the second aspect of the invention, in addition to the effects provided in the ultrafine crystal layer forming process defined in the first aspect of the invention, the machining operation using the machining tool is performed with a material temperature at the machined surface of the workpiece being held lower than a predetermined upper limit temperature, wherein the predetermined upper limit temperature is, where the workpiece is constituted by a steel material, an Ac1 transformation point of the steel material, and wherein the predetermined upper limit temperature is, where the workpiece is constituted by the metallic material other than the steel material, substantially half a melting point of the metallic material as expressed in terms of absolute temperature. Consequently, there is an effect that it is possible to stably form the ultrafine crystal layer in the surface layer portion of the machined surface of the workpiece that is constituted by a material having a relatively low hardness.

In the ultrafine crystal layer forming process defined in the third aspect of the invention, in addition to the effects provided in the ultrafine crystal layer forming process defined in the first aspect of the invention, the machining operation using the machining tool is performed with a material temperature at the machined surface of the workpiece being held within a predetermined temperature range, wherein the predetermined temperature range is, where the workpiece is constituted by a steel material, not lower than an Ac1 transformation point of the steel material and is lower than a melting point of the steel material, and wherein the predetermined temperature range is, where the workpiece is constituted by the metallic material other than the steel material, not lower than substantially half a melting point of the metallic material as expressed in terms of absolute temperature and is lower than the melting point of the metallic material.

Since the machined surface of the workpiece can be softened by thus raising the material temperature at the machined surface of the workpiece to a predetermined temperature or higher, there is an effect that the true strain of at least 1 can be assuredly imparted to the machined surface of the workpiece. Consequently, there is an effect that it is possible to stably form the ultrafine crystal layer in the surface layer portion of the machined surface of the workpiece, with the machining tool being restrained from be broken, even where the machining operation is performed on the workpiece constituted by a material having a relatively high.

In the ultrafine crystal layer forming process defined in the fourth aspect of the invention, in addition to the effects provided in the ultrafine crystal layer forming process defined in the third aspect of the invention, where the workpiece is constituted by the steel material, after the machining operation using the machining tool has been performed, the machined surface of the workpiece is cooled at a rate higher than a cooling rate that is required for hardening the workpiece. Thus, there is an effect that the hardness of the ultrafine crystal layer can be held high.

In the ultrafine crystal layer forming process defined in the fifth aspect of the invention, in addition to the effects provided in the ultrafine crystal layer forming process defined in any one of the second through fourth aspects of the invention, the machining operation using the machining tool is performed, such that a material temperature at the machined surface of the workpiece is held lower than the predetermined upper limit temperature or held within the predetermined temperature range, and such that a material temperature at a non-ultrafine crystal layer which is provided by a lower layer portion of the machined surface or which is provided by a surface layer portion in neighborhood of the machined surface is held at least about 500° C. for a length of time that is not larger than about 1 second, for providing the non-ultrafine crystal layer with a hardness that is about 80% as high as a hardness of a substrate of the workpiece.

Consequently, the non-ultrafine crystal layer located in the lower layer portion of the machined surface or located in the surface layer portion in neighborhood of the machined surface can be restrained from being thermally influenced by tempering or annealing, thereby providing an effect that restrains reduction in the hardness of the non-ultrafine crystal layer in the lower layer portion of the machined surface or in the surface layer portion in neighborhood of the machined surface. That is, it is possible to assure the hardness and strength of the non-ultrafine crystal layer in the lower layer portion of the machined surface or in the surface layer portion in neighborhood of the machined surface, while the ultrafine crystal layer is being formed in the machined surface.

In the machine component defined in the sixth aspect of the invention, the surface layer portion is at least partially provided by the ultrafine crystal layer formed by the ultrafine crystal layer forming process defined in any one of the first through fifth aspects of the invention. Thus, it is possible to improve a surface hardness of the machine component, and to improve a fatigue strength of the machine component owing to a compressive residual stress imparted thereto. Further, a wear resistance of the machine component can be improved, since it becomes hard to be recrystallized even under a high temperature. Consequently, there is an effect that makes it possible to improve the characteristics of the machine component.

Further, since the ultrafine crystal layer is formed by the ultrafine crystal layer forming process defined in any one of the first through fifth aspects of the invention, the ultrafine crystal layer can be formed at a low cost, there is an effect that a cost for the entirety of the machine component as a product can be restrained owing to the formation of the ultrafine crystal layer at the low cost.

In the machine component producing process defined in the seventh aspect of the invention, since there is provided at least the ultrafine crystal layer forming step of forming the ultrafine crystal layer in the machine component through the ultrafine crystal layer forming process defined in anyone of the first through fifth aspects of the invention, there is an effect that the machine component can be produced with the ultrafine crystal layer being stably formed at a restrained cost.

In the nanocrystal layer forming process defined in the eighth aspect of the invention, since the nanocrystal layer is formed in the surface layer portion of the machined surface by performing the machining operation using the machining tool, it is possible to restrain the problems, encountered in the conventional techniques, that portions of a workpiece in which the nanocrystal layer can be formed are limited depending upon a shape of the workpiece and that the thickness and characteristics of the nanocrystal layer are not uniform, Consequently, the nanocrystal layer forming process provides an effect that makes it possible to stably form the nanocrystal layer forming process in the workpiece such as a machine component.

Further, unlike in the conventional techniques, there is no need of additional provision of special installations such as a collision device for a metal weight and an ejection device for shot peening, thereby making it possible to restrain a cost required for the installations. Further, in a product producing process, it is possible to minimize modifications of the process required for formation of the nanocrystal layer, leading to reduction in a cost required for the formation of the nanocrystal layer and the consequent reduction in a cost required for the production of the product.

Further, in the conventional techniques, where the nanocrystal layer is to be formed over a wide area, the collision of the protrusion or the hard particles has to be repeated a plurality of times, thereby increasing a required forming time and resulting in inefficiency in the formation of the nanocrystal layer. On the other hand, in the nanocrystal layer forming process defined in the eighth aspect of the invention, since the nanocrystal layer is formed by performing the machining operation using the machining tool, it is possible to efficiently form the nanocrystal layer, leading to the consequent reduction in the cost for the formation of the nanocrystal layer.

Further, the machining operation using the machining tool causes the machined surface of the workpiece to be subjected to the plastic working that causes the machined surface of the workpiece to have the true strain of at least 7, and is performed with the material temperature at the machined surface of the workpiece being held within a predetermined temperature range, wherein the predetermined temperature range is, where the workpiece is constituted by a steel material, not lower than an Ac1 transformation point of the steel material and is lower than a melting point of the steel material, and wherein the predetermined temperature range is, where the workpiece is constituted by the metallic material other than the steel material, not lower than substantially half a melting point of the metallic material as expressed in terms of absolute temperature and is lower than the melting point of the metallic material.

Thus, the machined surface of the workpiece can be softened by raising the material temperature at the machined surface of the workpiece to the predetermined temperature or higher, the true strain of at least 7 can be assuredly imparted to the machined surface of the workpiece, while restraining restrains a load exerted on the machining tool and a machine in which the machining operation is performed. Consequently, even where the workpiece to be machined is constituted by a material having a high hardness, it is possible to restrain breakage of the machining tool, thereby providing an effect that enables the nanocrystal layer to be stably formed in the surface layer portion of the machined surface of the workpiece.

In the nanocrystal layer forming process defined in the ninth aspect of the invention, in addition to the effects provided in the nanocrystal layer forming process defined in the eighth aspect of the invention, the machining operation using the machining tool is performed, such that the material temperature at the machined surface of the workpiece is held within the predetermined temperature range, and such that the material temperature at a non-nanocrystal layer located in the lower layer portion of the machined surface or located in the surface layer portion in neighborhood of the machined surface is held at least about 500° C. for the length of time that is not larger than about 1 second, for providing the nanocrystal layer with the hardness that is about 80% as high as the hardness of the substrate of the workpiece.

Consequently, the non-nanocrystal layer located in the lower layer portion of the machined surface or located in the surface layer portion in neighborhood of the machined surface can be restrained from being thermally influenced by tempering or annealing, thereby providing an effect that restrains reduction in the hardness of the non-nanocrystal layer in the lower layer portion of the machined surface or in the surface layer portion in neighborhood of the machined surface. That is, it is possible to assure the hardness and strength of the non-nanocrystal layer in the lower layer portion of the machined surface or in the surface layer portion in neighborhood of the machined surface, while the nanocrystal layer is being formed in the machined surface.

In the nanocrystal layer forming process defined in the tenth aspect of the invention, since the nanocrystal layer is formed in the surface layer portion of the machined surface by performing the machining operation using the machining tool, it is possible to restrain the problems, encountered in the conventional techniques, that portions of a workpiece in which the nanocrystal layer can be formed are limited depending upon a shape of the workpiece and that the thickness and characteristics of the nanocrystal layer are not uniform, Consequently, the nanocrystal layer forming process provides an effect that makes it possible to stably form the nanocrystal layer forming process in the workpiece such as a machine component.

Further, unlike the conventional nanocrystal layer forming process, there is no need of additional provision of special installations such as a collision device for a metal weight and an ejection device for shot peening, thereby making it possible to restrain a cost required for the installations. Further, in a product producing process, it is possible to minimize modifications of the process required for formation of the nanocrystal layer, leading to reduction in a cost required for the formation of the nanocrystal layer and the consequent reduction in a cost required for the production of the product.

Further, in the conventional nanocrystal layer forming process, where the nanocrystal layer is to be formed over a wide area, the collision of the protrusion or the hard particles has to be repeated a plurality of times, thereby increasing a required forming time and resulting in inefficiency in the formation of the nanocrystal layer. On the other hand, in the nanocrystal layer forming process defined in the eighth aspect of the invention, since the nanocrystal layer is formed by performing the machining operation using the machining tool, it is possible to efficiently form the nanocrystal layer, leading to the consequent reduction in the cost for the formation of the nanocrystal layer.

In the nanocrystal layer forming process defined in the eleventh aspect of the invention, in addition to the effects provided in the nanocrystal layer forming process defined in the tenth aspect of the invention, the machining operation using the machining tool causes the machined surface of the workpiece to be subjected to the plastic working that causes the machined surface of the workpiece to have the true strain of at least 7, and is performed with the material temperature at the machined surface of the workpiece being held not higher than the predetermined upper limit temperature. Thus, there is an effect that the nanocrystal layer can be assuredly formed in the surface layer portion of the machined surface of the workpiece.

In the nanocrystal layer forming process defined in the twelfth aspect of the invention, in addition to the effects provided in the nanocrystal layer forming process defined in the eleventh aspect of the invention, the machining operation using the machining tool is performed with the material temperature at the machined surface of the workpiece being held such that the overall time-based average value of the material temperature during the machining operation and the overall surface-based average value of the material temperature in the entirety of the machined surface over which the heat is distributed are not higher than the predetermined upper limit temperature. That is, the material temperature may be increased to be momentarily or locally higher than the predetermined upper limit temperature, as long as the overall time-based and overall surface-based average values of the material temperature are held not higher than the predetermined upper limit temperature. It is therefore possible to reduce a cost required for controlling the material temperature, thereby providing an effect that restrains the cost for the formation of the nanocrystal layer.

In the nanocrystal layer forming process defined in the thirteenth aspect of the invention, in addition to the effects provided in the nanocrystal layer forming process defined in any one of the eighth through twelfth aspects of the invention, the machining operation using the machining tool is performed such that the strain gradient of at least 1/μm is imparted to the surface layer portion of the machined surface. Thus, there is an effect that the nanocrystal layer can be assuredly formed in the surface layer portion of the machined surface of the workpiece.

In the machine component defined in the fourteenth aspect of the invention, the surface layer portion is at least partially provided by the nanocrystal layer formed by the nanocrystal layer forming process defined in any one of the eighth through thirteenth aspects of the invention. Thus, it is possible to improve a surface hardness of the machine component, and to improve a fatigue strength of the machine component owing to a compressive residual stress imparted thereto. Further, a wear resistance of the machine component can be improved, since it becomes hard to be recrystallized even under a high temperature. Consequently, there is an effect that makes it possible to improve the characteristics of the machine component.

Further, since the nanocrystal layer is formed by the nanocrystal layer forming process defined in any one of the eighth through thirteenth aspects of the invention, the nanocrystal layer can be formed at a low cost, there is an effect that a cost for the entirety of the machine component as a product can be restrained owing to the formation of the nanocrystal layer at the low cost.

In the machine component producing process defined in the fifteenth aspect of the invention, since there is provided at least the nanocrystal layer forming step of forming the nanocrystal layer in the machine component through the nanocrystal layer forming process defined in any one of the eighth through thirteenth aspects of the invention, there is an effect that the machine component can be produced with the nanocrystal layer being stably formed at a restrained cost.

BRIEF DESCRIPTION OF DRAWINGS

FIG. 5 A set of views explaining an ultrafine crystal layer forming process in a third embodiment, wherein view (a) is a perspective view of the workpiece during a slide machining operation by a pressing tool P, while view (b) is a transverse cross-sectional view of the workpiece taken along line 5(b)-5(b) in view (a).

EXPLANATION OF REFERENCE SIGN

W workpiece
C1 ultrafine crystal layer
11 surface layer (ultrafine crystal layer)
C2 nanocrystal layer
31 surface layer (nanocrystal layer)
C3 nanocrystal layer
D drill (machining tool)
E endmill
P pressing tool (machining tool)

BEST MODE FOR CARRYING OUT THE INVENTION

Hereinafter, preferred embodiments of the present invention will be described with reference to the drawings. In a first embodiment, there will be described, as an ultrafine crystal layer forming process, a process of forming an ultrafine crystal layer in a surface layer portion of a machined surface of a workpiece, by forming (machining) a hole in the workpiece with use of a drill D (machining tool).

The ultrafine crystal refers to a crystal having a grain size (length) of from 100 nm to 1 μm. The ultrafine crystal layer refers to a structure including the ultrafine crystal that is constituted by at least 50% of the crystal structure. The term "ultrafine crystal layer" recited in any one of the first through seventh aspects of the invention has the same meaning.

It is noted that the grain size (length) of the ultrafine crystal does not necessarily have to be from 100 nm to 1 μm as measured in any directions, as long as it is from 100 nm to 1 μm in at least one direction. That is, the ultrafine crystal does not necessarily have to be provided by a crystal circular in its cross section, but may be provided by a crystal having a flat shape in its cross section.

Further, the ultrafine crystal layer may be provided by a mixed grain structure, as long as a content of the ultrafine crystal in the structure is at least 50%. The remainder of the structure may be constituted by any form of crystal.

Figure 1A:
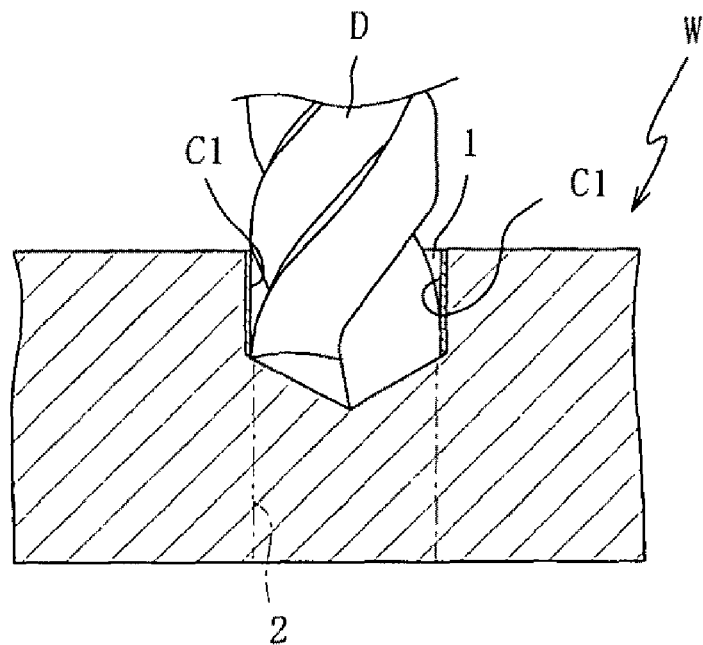
FIG. 1 A set of views explaining an ultrafine crystal layer forming process in a first embodiment of the present invention, wherein view (a) is a cross section view of a workpiece when the workpiece is subjected to a drilling operation by a drill, and view (b) is a cross sectional view of the workpiece after the drilling operation.
Figure 1B:
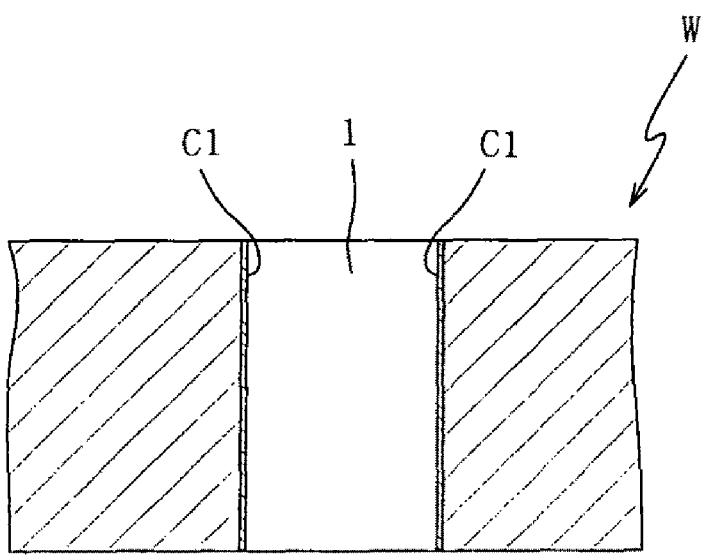

FIG. 1 is a set of views explaining the ultrafine crystal layer forming process in the first embodiment of the present invention, wherein view (a) is a cross section view of a workpiece W when the workpiece W is subjected to a drilling operation by the drill D, and view (b) is a cross sectional view of the workpiece W after the drilling operation. It is noted that parts of the drill D and the workpiece W are not shown in FIG. 1.

In the ultrafine crystal layer forming process in the first embodiment, the drilling operation is performed by the drill D so as to form a hole 1 in the workpiece W (see view (a) of FIG. 1), satisfying two i.e., first and second machining conditions as indicated below, whereby the ultrafine crystal layer C1 can be formed in an inner circumferential surface (surface layer portion of a machined surface) of the hole 1 (see view (b) of FIG. 1).

The first machining condition is provided by a condition that the inner circumferential surface of the hole 1 is subjected to a plastic working that causes the inner circumferential surface of the hole 1 to have a true strain of at least 1. This condition can be satisfied by performing the drilling operation in accordance with a cutting condition indicated by FIG. 2. The cutting condition will be described with reference to FIG. 2.

Figure 2:
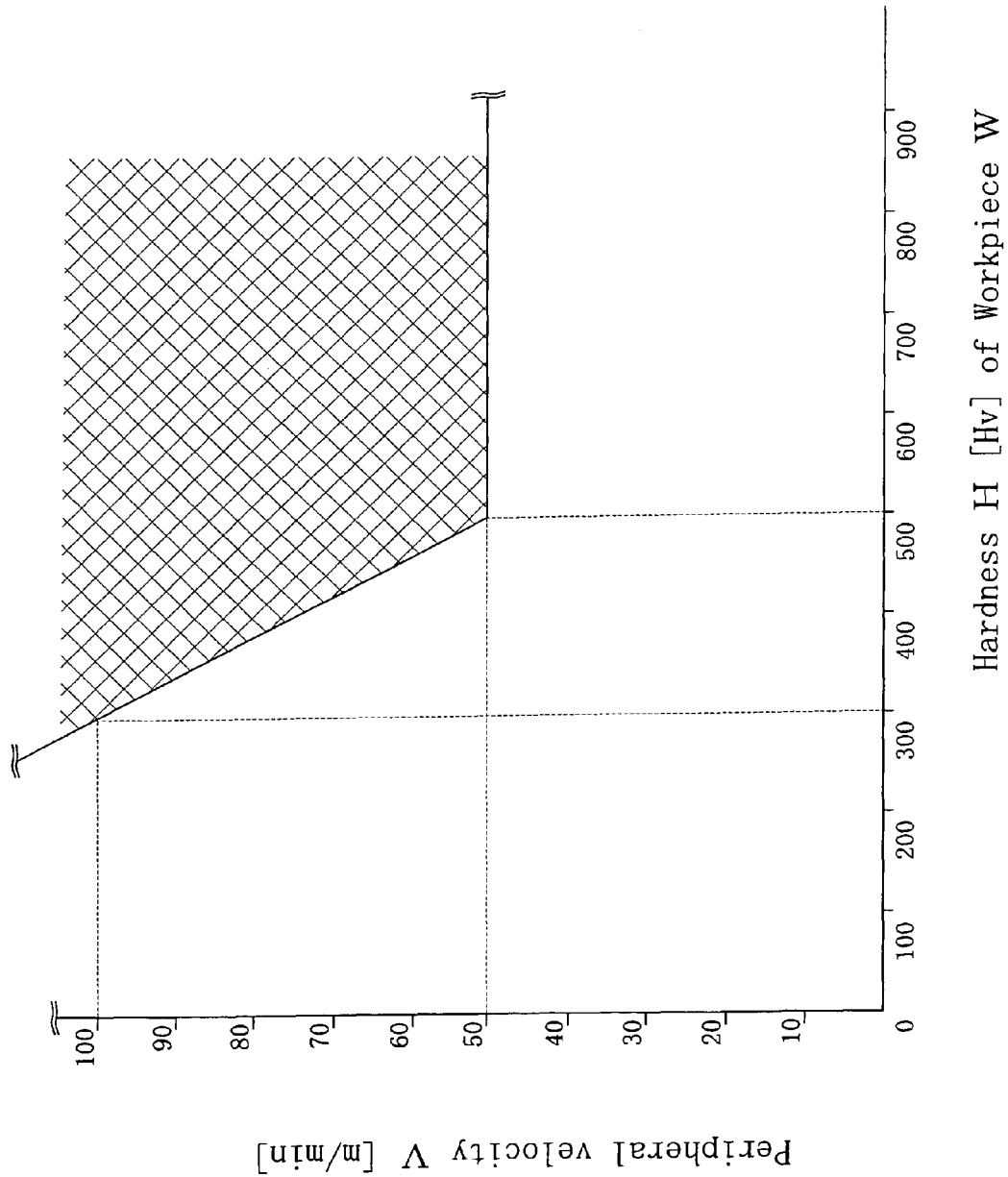
FIG. 2 A view showing a cutting condition as a first machining condition.

FIG. 2 is a view showing the first machining condition in the form of the cutting condition (cutting condition for forming the ultrafine crystal layer). In FIG. 2, the abscissa indicates a hardness (Hv) of the workpiece W, while the ordinate indicates a peripheral velocity (m/min) of the drill D.

As shown in FIG. 2, the first machining condition defines the peripheral velocity V [m/min] of the drill D in association with the hardness H [Hv] of the workpiece W. By machining the hole 1 with the drill D in accordance with the first machining condition, it is possible to cause the inner circumferential surface of the hole 1 to be subjected to a plastic working that provides the inner circumferential surface with the true strain of at least 1.

Specifically, as shown in FIG. 2, where the hardness H of the workpiece W is lower than 500 [Hv], the peripheral velocity V of the drill D is defined as V=175−H/4 [m/min]. Where the hardness H of the workpiece W is not lower than 500 [Hv], the peripheral velocity V of the drill D is defined as V=50 [m/min].

It is preferable that a feed amount of the drill D is not larger than 0.3 mm per one revolution thereof, so that the plastic working of the true strain of at least 1 can be assuredly imparted to the inner circumferential surface of the hole 1, while a load exerted on the drill D is restrained.

It is preferable that the cutting condition as the first machining condition is that the peripheral velocity V of the drill D is not lower than (175−H/4) [m/min] with the feed amount of the drill D per one revolution thereof being not larger than 0.05 mm, where the hardness H of the workpiece W is lower than 500 [Hv], and that the peripheral velocity V of the drill D is not lower 75 [m/min] with the feed amount of the drill D per one revolution thereof being not larger than 0.05 mm, where the hardness H of the workpiece W is not lower than 500 [Hv]. This cutting condition further assuredly causes the inner circumferential surface of the hole 1 to be subjected to the plastic working that provides the inner circumferential surface with the true strain of at least 1, while restraining the load exerted on the drill D.

While there has been described a case as shown FIG. 1 where the hole 1 is drilled by the drill D without a hole previously formed in the workpiece E, the process is not limited to the above detail. That is, the drilling operation with the drill D may be performed after formation of a prepared hole.

Specifically, the process may be initiated with formation of a prepared hole 2 (indicated by one-dot chain line in view (a) of FIG. 1) with a drill having a diameter that is smaller than a predetermined diameter. Then, the prepared hole 2 may be enlarged by the drill D or a reamer having diameter substantially equal to the predetermined diameter, so that the hole 1 is finished to have the predetermined diameter. The formation of the prepared hole 2 is made in accordance with an ordinary cutting condition (for example, at a peripheral velocity of not higher that 20 [m/min]), while the finishing of the hole 1 with the drill D or the reamer is made in accordance with the first machining condition (cutting condition for forming the ultrafine crystal layer) as shown in FIG. 2.

The second machining condition is provided by a condition that a material temperature at the machined surface of the hole 1 is held within a predetermined temperature range (hereinafter referred to as "temperature range") during the drilling operation with the drill D. That is, the material temperature at the machined surface of the hole 1 is held within the predetermined temperature range, by adjusting an amount of supply of cutting oil to a cutting portion and the cutting condition (such as the peripheral velocity V and the feed amount of the drill D).

Where the workpiece W is constituted by a steel material, the temperature range is not lower than an Ac1 transformation point of the steel material and is lower than a melting point of the steel material. Where the workpiece W is constituted by a metallic material (for example, aluminum alloy, titanium alloy) other than the steel material, the temperature range is not lower than substantially half a melting point of the metallic material and is lower than the melting point of the metallic material.

It is noted that the melting point is expressed in terms of absolute temperature. For example, where the melting point is 1500° C., a temperature substantially half the melting point is about 886.5 K (=1773 K/2).

The term "the material temperature is held within the temperature range" in the second machining condition is interpreted to mean a condition that is satisfied as long as an overall time-based average value of the material temperature after initiation of the machining of the hole 1 with the drill D and an overall surface-based average value of the material temperature in an entirety of the machined surface of the hole 1 over which a heat is distributed are both held in the temperature range.

That is, even if the material temperature at the machined surface measured immediately after the initiation of the machining of the hole 1 with the drill D is lower than a lower limit of the temperature range, the second machining condition is satisfied as long as the above-described time-based average value of the material temperature is eventually held in the temperature range.

Further, the workpiece W may be heated by heating means (for example, gas furnace and electric furnace) before the initiation of the machining of the hole 1 with the drill D. This facilitates the formation of the ultrafine crystal layer C1 and also softening of the workpiece W, reducing load applied to the drill D (machining tool) and a machining apparatus and accordingly making it possible to restrain their breakages.

Next, there will be described a result of the drilling operation with application of the above-described ultrafine crystal layer forming process. The workpiece W used in the drilling operation is constituted by a carbon steel (JIS-S55C), whose hardness is increased to about 7.8 GPa (800 Hv) by a hardening treatment.

Figure 3:
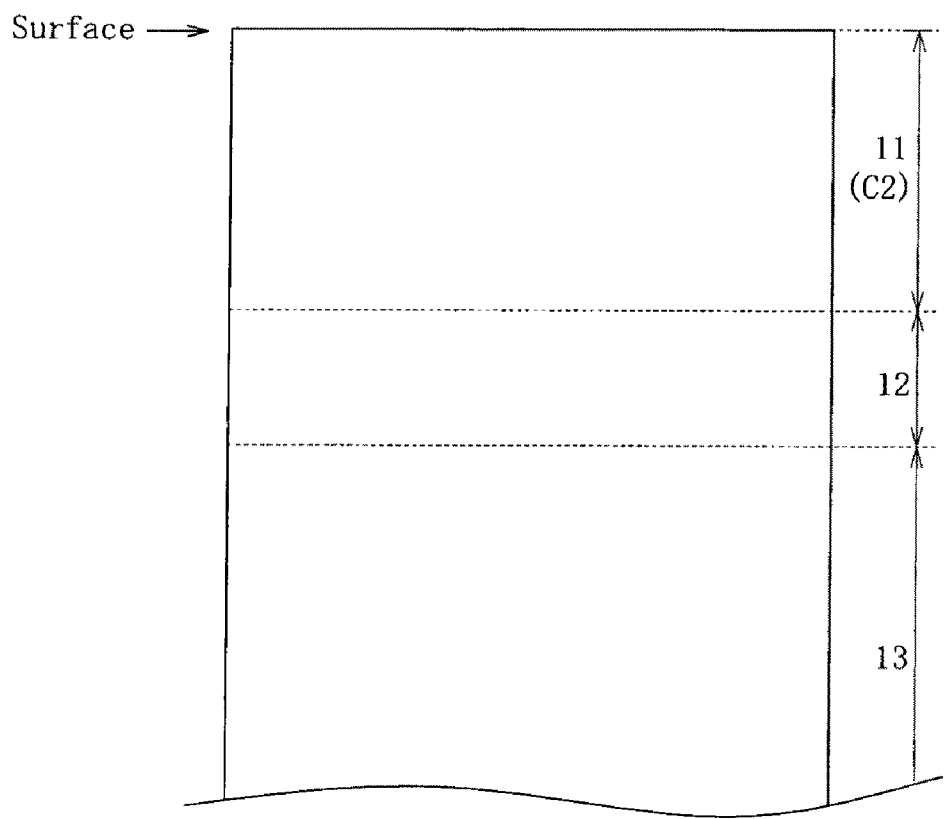
FIG. 3 A view showing a cross section of a structure of a portion of the workpiece surrounding a hole.

As a result of the formation of the hole 1 in the workpiece W with use of the drill D in accordance with the above-described first and second machining conditions, the ultrafine crystal layer C1 is formed in the inner circumferential surface of the hole 1, as shown in view (b) of FIG. 1. Referring now to FIG. 3, there will be described an outcome of detailed observation of the inner circumferential surface of the hole 1.

FIG. 3 is a cross sectional view showing a structure of a portion of the workpiece W surrounding the hole 1. In the inner circumferential surface of the hole 1, as shown in FIG. 3, there were observed a surface layer 11 and a second layer 12 that are arranged in the order of description in a direction away from the inner circumferential surface (in a direction away from an upper side as seen in FIG. 3). It is noted that there was a non-machined region (region that is not influenced by the machining with the drill D) 13 located on a lower side of the second layer 12 (as seen in FIG. 3).

In the surface layer 11 defining the hole 1, there was observed the ultrafine crystal layer C1 in which its grain size was about 600 nm. In this ultrafine crystal layer C1, it was confirmed that its hardness was increased to 1000 Hv. It is considered that the surface layer 11 was recrystallized in α phase by generated heat and then residue α was caused to have an island-like shape in a further heated phase, i.e., (α+γ) two-phases region during the machining operation with the drill D, and that eventually solid solution γ containing carbon was transformed to (α+martensite) during cooling after the machining operation. It is noted that a plastic deformation with true strain of at least 1 was imparted to the surface layer 11.

In the first embodiment, the surface layer 11 had a thickness (depth as measured from the surface to a lower surface of the surface layer 11) of about 10 μm. It was confirmed that the thickness (depth) of such a layer was increased with increase of the peripheral velocity V of the drill D. Further, it was confirmed that the thickness (depth) of such a layer was increased with increase of the diameter of the drill D where the peripheral velocity V of the drill D was constant.

The second layer 12 is considered as a region that was formed by a static recrystallization caused by heating up to about 700° C. during the drilling operation with the drill D (i.e., a region that was tempered upon thermal influence during the drilling operation). It is noted that the second layer 12 corresponds to "the non-ultrafine crystal layer which is provided by a lower layer portion of the machined surface" recited in the fifth aspect of the invention.

In the drilling operation (machining operation) by the drill D, it is preferable that the amount of supply of the cutting oil and the cutting condition (such as the peripheral velocity V and the feed amount of the drill D) are adjusted such that the material temperature at the machined surface is controlled to satisfy the above-described second machining condition and such that the material temperature at the second layer 12 is controlled to be about 500° C. or higher for a length of time that is not larger than about 1 second. Owing to this arrangement, the second layer 12 is restrained from being tempered, making it possible to assure the hardness and strength.

Further, after the drilling operation by the drill D, it is preferable that the surface layer 11 (ultrafine crystal layer C1) is cooled at a rate higher than a cooling rate that is required for hardening the workpiece W. Owing to this arrangement, the structure can be fined by utilizing the elastic deformation obtained in the drilling operation by the drill D and also a heat treatment transformation, whereby the hardness of the ultrafine crystal layer C1 can be further increased.

Next, there will be described an outcome of an annealing treatment performed on the workpiece W in which the ultrafine crystal layer C1 has been formed. It is noted that the annealing treatment was carried out with the workpiece W being held at a temperature of 600° C. in an ambient atmosphere for 1 hour.

In the workpiece W after the annealing treatment, the grain size of the ultrafine crystal layer C1 in the surface layer 11 was held in about 600 nm. Thus, in the ultrafine crystal layer C1, the crystal grains are difficult to be recrystallized even by the annealing treatment. That is, it was confirmed that the ultrafine crystal layer C1 is excellent in its temperature insensitivity.

Next, there will be described a result of a test for torsion fatigue strength, which was conducted in a case where the ultrafine crystal layer forming process according to the first embodiment was applied to production of an input shaft used in an automatic transmission. The input shaft is constituted by the material same as the above-described workpiece W, and is provided by a long shaft having a horizontal hole formed therein. The horizontal hole extends in an axial direction of the shaft and serves to introduce lubricant oil.

In an outer circumferential surface of the input shaft, there are formed a plurality of branch holes which are held in communication with the horizontal hole and through which the lubricant oil is to be supplied. The branch holes were formed in accordance with the above-described ultrafine crystal layer forming process. Thus, an inner circumferential surface of each branch hole is provided by the ultrafine crystal layer C1, and is accordingly provided with an improved hardness.

In the test, the torsion fatigue strength in a portion of the input shaft in which each branch was formed was 378653 times as its average value with application of torque of 392 Nm and was 95727 times as its average value with application of torque of 451 Nm. As compared with a conventional product without the ultrafine crystal layer C1 being provided in the inner circumferential surface of each branch hole, it was confirmed that the strength (torque ratio measured after torque applications about 90000 times) was increased by about 20%.

Figure 4:
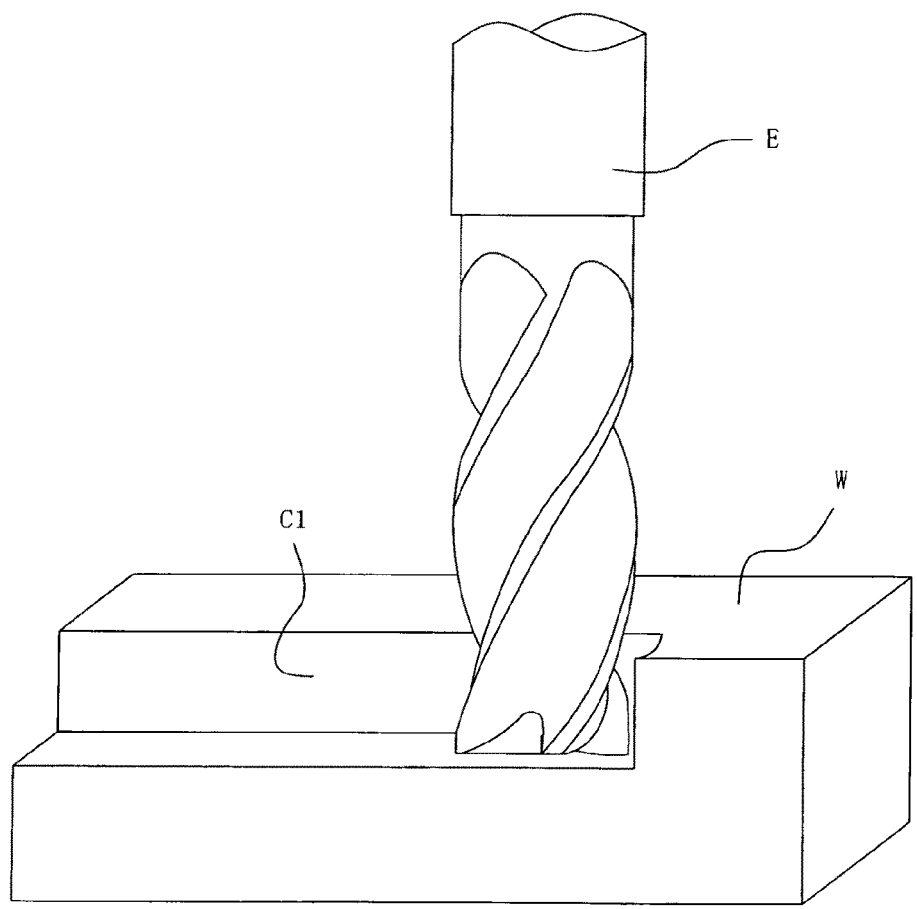
FIG. 4 A view explaining an ultrafine crystal layer forming process in a second embodiment, and a perspective view of the workpiece during a cutting operation by an endmill.

Referring next to FIG. 4, there will be described a second embodiment of the invention. While the ultrafine crystal layer C1 is formed through the drilling operation using the drill D in the ultrafine crystal layer forming process according to the first embodiment, the ultrafine crystal layer C1 is formed through a cutting operation using an endmill E in the ultrafine crystal layer forming process according to the second embodiment. It is noted that the same reference signs as used in the above-described first embodiment will be used to identify the same portions, and description of the same portions will not be provided.

FIG. 4 is a view explaining the ultrafine crystal layer forming process in the second embodiment, and is a perspective view of the workpiece W during the cutting operation by the endmill E. It is noted that FIG. 4 does not show a holder holding the endmill E and transmitting a torque from a machining apparatus to the endmill E.

In the ultrafine crystal layer forming process in the second embodiment, as shown in FIG. 4, the cutting operation (machining operation) is performed by the endmill E on the workpiece W, satisfying the two i.e., first and second machining conditions as described above, whereby the ultrafine crystal layer C1 can be formed in the surface layer portion of the machined surface of the workpiece W.

Specifications of the workpiece W and the endmill E will be described. The workpiece is made of a carbon steel (JIS-SUJ2) as a material, and was subjected to a hardening as a heat treatment so as to have a hardness of 790 [Hv]. The endmill E is made of a cemented carbide as a material, coated with TiAlN coating and has a cutting diameter of φ 10 mm. The cutting operation by the endmill E was performed without using cutting oil, under a cutting condition with the peripheral velocity of 150 m/min, feed amount of 0.18 mm/rev, axial depth of cut of 2 mm and radial depth of cut of 0.1 mm.

As a result of the cutting operation performed on the workpiece W under the above-described cutting operation, the plastic working causing the true strain of at least 1 was imparted to the machined surface of the workpiece W (the above-described first machining condition), while the material temperature at the machined surface was increased to the Ac1 transformation point or higher (the above-described second machining condition), so that the ultrafine crystal layer C1 was formed in the machined surface.

As an outcome of detailed observation of the workpiece W after the cutting operation, it was confirmed that the ultrafine crystal layer C1 having a thickness of about 2.5 ìm was formed in the workpiece W.

Referring next to FIG. 5, there will be described a third embodiment of the invention. While the ultrafine crystal layer C1 is formed through the drilling operation using the drill D in the ultrafine crystal layer forming process according to the first embodiment, the ultrafine crystal layer C1 is formed through a slide machining operation using a pressing tool P. It is noted that the same reference signs as used in the above-described first embodiment will be used to identify the same portions, and description of the same portions will not be provided.

FIG. 5 is a set of views explaining the ultrafine crystal layer forming process in the third embodiment, wherein view (a) is a perspective view of the workpiece W during the slide machining operation by the pressing tool P, while view (b) is a transverse cross-sectional view of the workpiece W taken along line Vb-Vb in view (a).

It is noted that, in view (a) of FIG. 5, there is not shown a holder holding the workpiece W and transmitting a torque from a lathe to the workpiece W. Further, view (b) of FIG. 5 shows a transverse cross section of the workpiece W after the slide machining operation by the pressing tool P.

The ultrafine crystal layer forming process according to the third embodiment is a process of forming the ultrafine crystal layer C1 in the surface layer portion of the machined surface of the workpiece W where the workpiece W is constituted by a material having a relatively low hardness. Specifically, the ultrafine crystal layer C1 is formed in the surface layer portion (surface layer portion of the machined surface) (see view (b) of FIG. 5), by performing the slide machining operation (machining operation) on the workpiece W with the pressing tool P (machining tool), satisfying the above-described first machining condition (see view (a) of FIG. 5).

However, in the ultrafine crystal layer forming process according to the third embodiment, a condition (hereinafter referred to as "third machining condition") different from the above-described second machining condition is applied.

The third cutting condition is provided by a condition that a material temperature at a machined outer circumferential surface 21 is held lower than a predetermined temperature (hereinafter referred to as "upper limit temperature") during the slide machining operation with the pressing tool P. That is, the material temperature at the machined outer circumferential surface 21 is restrained from being increased, by adjusting an amount of supply of a coolant to a machining portion and a rotation speed of the workpiece W.

Where the workpiece W is constituted by a steel material, the upper limit temperature is an Ac1 transformation point of the steel material. Where the workpiece W is constituted by a metallic material (for example, aluminum alloy, titanium alloy) other than the steel material, the upper limit temperature is substantially half a melting point of the metallic material. It is noted that the melting point is expressed in terms of absolute temperature, as in the above-described cases.

The term "the material temperature is held lower than the upper limit temperature" in the third machining condition is interpreted to mean a condition that is satisfied as long as an overall time-based average value of the material temperature during the slide machining of the outer circumferential surface 21 with the pressing tool P and an overall surface-based average value of the material temperature in an entirety of the machined outer circumferential surface 21 over which a heat is distributed are both held lower than the upper limit temperature. That is, even if the material temperature at the machined surface is increased to be momentarily or locally higher than the upper limit temperature, the third machining condition is satisfied as long as the above-described overall time-based and overall surface-based average values of the material temperature are held lower than the upper limit temperature.

The slide machining operation is a machining operation in which the pressing tool P is pressed, by a predetermined pressure, against the outer circumferential surface 21 of the workpiece W while the workpiece W is being rotated (in a direction indicated by arrow R as shown in view (a) of FIG. 5), whereby the outer circumferential surface 21 of the workpiece W is slid on the pressing tool P, so as to be subjected to a plastic working.

Specifications of the workpiece W and the pressing tool P will be described. The workpiece is made of a carbon steel (JIS-S10C) as a material and has a hardness of 3.9 GPa (400 Hv). The outside diameter of the machined outer circumferential surface 21 is φ 10 mm. The pressing tool P is made of a tool steel (JIS-SKD61) as a material, and has a hardness of 8.3 GPa (850 Hv) and a width (as measured in a horizontal direction as seen in view (a) of FIG. 5) of 5 mm.

In the formation of the ultrafine crystal layer C1, a surface pressure (e.g., 100 MPa) of the pressing tool P, a length of time (e.g., 3 minutes) for the slide machining operation, the rotation speed of the workpiece W and the amount of supply of the coolant are suitably adjusted so as to satisfy the first machining condition (condition required for imparting the plastic working of the true strain of at least 1) and the third machining condition (temperature condition).

Next, there will be described a result of the slide machining operation with application of the ultrafine crystal layer forming process according to the third embodiment. As a result of the slide machining operation performed on the outer circumferential surface 21 with use of the pressing tool P satisfying the above-described first and third machining conditions, as shown in view (a) of FIG. 5, the ultrafine crystal layer C1 is formed in the outer circumferential surface 21, as shown in view (b) of FIG. 5.

In a detailed observation of the workpiece W after the slide machining operation, it was confirmed that the hardness in an inner portion in which the ultrafine crystal layer C1 was not formed was 3.9 GPa (400 Hv) while the hardness in the ultrafine crystal layer C1 was increased to 1.5 times or higher.

Further, there will be described an outcome of an annealing treatment performed on the workpiece W in which the ultrafine crystal layer C1 has been formed. It is noted that the annealing treatment was carried out with the workpiece W being held at a temperature of 600° C. in an ambient atmosphere for 1 hour.

In the workpiece W after the annealing treatment, the hardness in the inner portion in which the ultrafine crystal layer C1 was not formed was 1.5 GPa (150 Hv), while the hardness in the ultrafine crystal layer C1 was twice or higher, namely, was kept high. Thus, the crystal grains in the ultrafine crystal layer C1 are difficult to be recrystallized even by the annealing treatment, so that the ultrafine crystal layer C1 is excellent in its temperature insensitivity. Therefore, by applying the ultrafine crystal layer forming process of the third embodiment to a sliding surface of a rotary shaft, it is possible to improve a wear resistance of the sliding surface and accordingly to lengthen a life of the rotary shaft.

While the present invention has been described based on the first through third embodiments, it is to be easily imagined that the present invention is not at all limited to the details of the above-described embodiments but may be subjected to various improvements and modifications within a range that is not deviated from the gist of the invention.

For example, in the above-described first through third embodiments, there have been described, as examples of the machining operation for forming the ultrafine crystal layer C1, the drilling operation using the drill D, the cutting operation using the endmill E and the slide machining operation using the pressing tool P. However, the machining operation is not limited to any one of these machining operations, but may be other kind of machining operation which can satisfy both of the above-described first and second (or third) machining conditions.

As examples of the other kind of machining operation, there are a cutting operation such as a lathe operation using a lathe tool, a milling operation with a milling tool, a planing operation using a planing tool, and a gear hobbing operation using a hob; a grinding operation such as a finishing operation using a grinding tool; and an abrading operation such as a burnishing operation using a burnishing tool.

Further, while there has been described, as an example of the machine component having the ultrafine crystal layer C1, the input shaft for the automatic transmission in the above-described first embodiment, the machine component is necessarily neither the input shaft nor any one of the other components of an automotive vehicle. That is, the machine component may be any machine component, as long as it is constituted by a metallic material. As other machine component, there can be enumerated, for example, a structural component used for a construction.

In the above-described first through third embodiments, there have been described cases in each of which the workpiece W is constituted by the steel material. However, the workpiece W does not necessarily have to be constituted by the steel material, but may be constituted by any one of the other metallic materials other than the steel material. As the other metallic materials, there can be enumerated, for example, aluminum, magnesium, titanium, copper, and any combinations thereof. That is, the metallic material recited in any one of the first through seventh aspects of the invention is not limited to any one of the steel materials and metallic materials enumerated herein, but is interpreted to encompass various kinds of metallic materials.

Referring next to FIGS. 6-10, there will be described a fourth embodiment. In the fourth embodiment, there will be described, as a nanocrystal layer forming process, a process of forming an nanocrystal layer in a surface layer portion of a machined surface of a workpiece, by forming (machining) a hole in the workpiece with use of a drill D (machining tool).

The nanocrystal refers to a crystal having a grain size (length) of not larger 100 nm. The nanocrystal layer refers to a structure including the nanocrystal that is constituted by at least 50% of the crystal structure. The term "nanocrystal layer" recited in any one of the eighth through fifteenth aspects of the invention has the same meaning.

It is noted that the grain size (length) of the nanocrystal does not necessarily have to be 100 nm or less as measured in any directions, as long as it is 100 nm or less as measured in at least one direction. That is, the nanocrystal does not necessarily have to be provided by a crystal circular in its cross section, but may be provided by a crystal having a flat shape in its cross section.

Further, the nanocrystal layer may be provided by a mixed grain structure, as long as a content of the nanocrystal in the structure is at least 50%. The remainder of the structure may be constituted by any form of crystal.

Figure 6A:
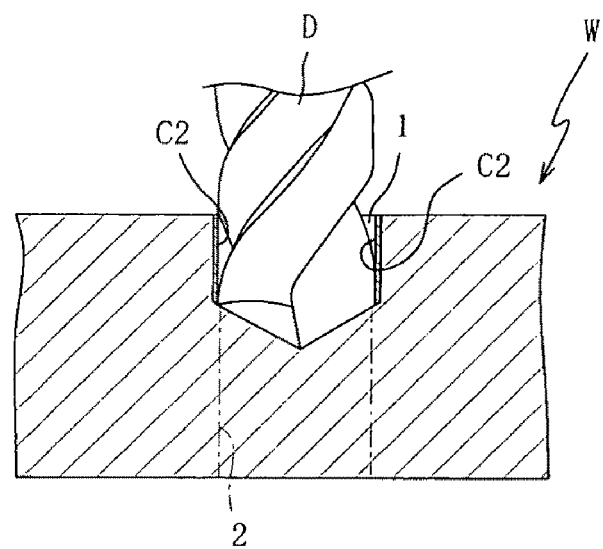
FIG. 6 A set of views explaining a nanocrystal layer forming process in a fourth embodiment, wherein view (a) is a cross section view of a workpiece when the workpiece is subjected to a drilling operation by the drill, and view (b) is a cross sectional view of the workpiece after the drilling operation.
Figure 6B:
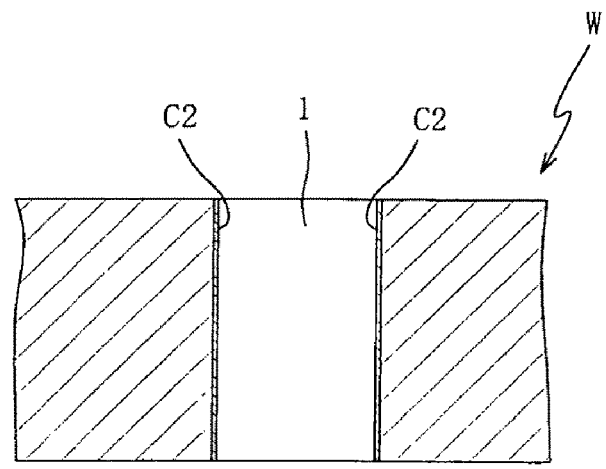

FIG. 6 is a set of views explaining the nanocrystal layer forming process in the fourth embodiment of the present invention, wherein view (a) is a cross section view of a workpiece W when the workpiece W is subjected to a drilling operation by the drill D, and view (b) is a cross sectional view of the workpiece W after the drilling operation. It is noted that parts of the drill D and the workpiece W are not shown in FIG. 6.

In the nanocrystal layer forming process in the fourth embodiment, the drilling operation is performed by the drill D so as to form a hole 1 in the workpiece W (see view (a) of FIG. 6), satisfying two i.e., fourth and fifth machining conditions as indicated below, whereby the nanocrystal layer C2 can be formed in an inner circumferential surface (surface layer portion of a machined surface) of the hole 1 (see view (b) of FIG. 6).

The fourth machining condition is provided by a condition that the inner circumferential surface of the hole 1 is subjected to a plastic working that causes the inner circumferential surface of the hole 1 to have a true strain of at least 7. This condition can be satisfied by performing the drilling operation in accordance with a cutting condition indicated by FIG. 7. The cutting condition will be described with reference to FIG. 7.

Figure 7:
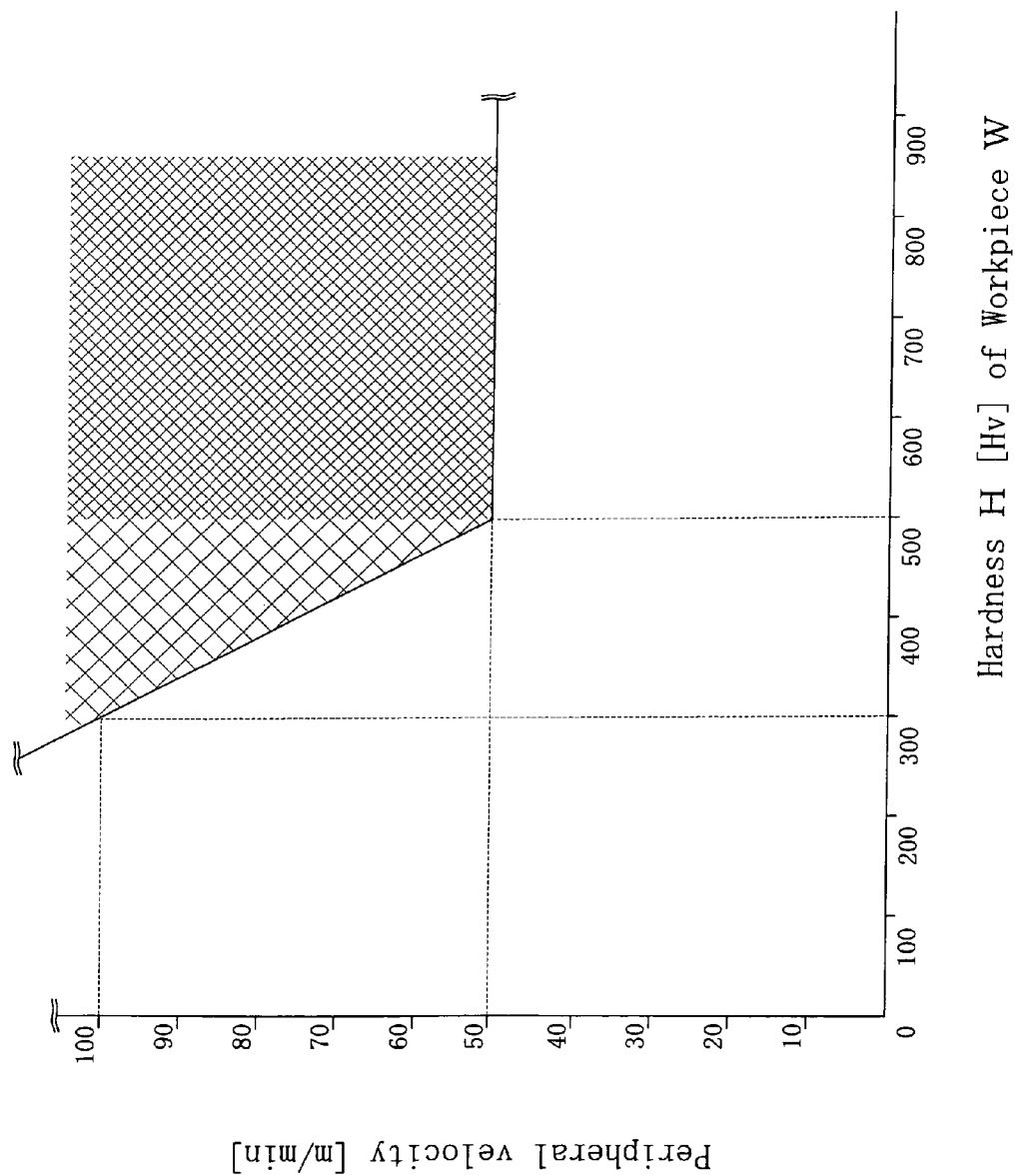
FIG. 7 A view showing a cutting condition as a fourth machining condition.

FIG. 7 is a view showing the fourth machining condition in the form of the cutting condition (cutting condition for forming the nanocrystal layer). In FIG. 7, the abscissa indicates a hardness (Hv) of the workpiece W, while the ordinate indicates a peripheral velocity (m/min) of the drill D.

As shown in FIG. 7, the fourth machining condition defines the peripheral velocity V [m/min] of the drill D in association with the hardness H [Hv] of the workpiece W. By machining the hole 1 with the drill D in accordance with the fourth machining condition, it is possible to cause the inner circumferential surface of the hole 1 to be subjected to a plastic working that provides the inner circumferential surface with the true strain of at least 7.

Specifically, as shown in FIG. 7, where the hardness H of the workpiece W is lower than 500 [Hv], the peripheral velocity V of the drill D is defined as V=175−H/4 [m/min]. Where the hardness H of the workpiece W is not lower than 500 [Hv], the peripheral velocity V of the drill D is defined as V=50 [m/min].

It is preferable that a feed amount of the drill D is not larger than 0.2 mm per one revolution thereof, so that the plastic working of the true strain of at least 7 can be assuredly imparted to the inner circumferential surface of the hole 1, while a load exerted on the drill D is restrained.

A recommendable cutting condition (preferable condition for forming the nanocrystal layer C2) as the fourth machining condition is that the hardness H of the workpiece W is lower than 500 [Hv], and the peripheral velocity V of the drill D is not lower than 50 [m/min] with the feed amount of the drill D per one revolution thereof being not larger than 0.2 mm.

A further recommendable cutting condition is that the hardness H of the workpiece W is lower than 500 [Hv], and the peripheral velocity V of the drill D is not lower than 75 [m/min] with the feed amount of the drill D per one revolution thereof being not larger than 0.05 mm. This cutting condition further assuredly causes the inner circumferential surface of the hole 1 to be subjected to the plastic working that provides the inner circumferential surface with the true strain of at least 7, while restraining the load exerted on the drill D.

While there has been described a case as shown FIG. 6 where the hole 1 is drilled by the drill D without a hole previously formed in the workpiece E, the process is not limited to the above detail. That is, the drilling operation with the drill D may be performed after formation of a prepared hole.

Specifically, the process may be initiated with formation of a prepared hole 2 (indicated by one-dot chain line in view (a) of FIG. 6) with a drill having a diameter that is smaller than a predetermined diameter. Then, the prepared hole 2 may be enlarged by the drill D or a reamer having diameter substantially equal to the predetermined diameter, so that the hole 1 is finished to have the predetermined diameter. The formation of the prepared hole 2 is made in accordance with an ordinary cutting condition (for example, at a peripheral velocity of not higher that 20 [m/min]), while the finishing of the hole 1 with the drill D or the reamer is made in accordance with the fourth machining condition (cutting condition for forming the nanocrystal layer) as shown in FIG. 7.

The fifth machining condition is provided by a condition that a material temperature at the machined surface of the hole 1 is held within a predetermined temperature range (hereinafter referred to as "temperature range") during the drilling operation with the drill D. That is, the material temperature at the machined surface of the hole 1 is held within the predetermined temperature range, by adjusting an amount of supply of cutting oil to a cutting portion and the cutting condition (such as the peripheral velocity V and the feed amount of the drill D).

Where the workpiece W is constituted by a steel material, the temperature range is not lower than an Ac1 transformation point of the steel material and is lower than a melting point of the steel material. Where the workpiece W is constituted by a metallic material (for example, aluminum alloy, titanium alloy) other than the steel material, the temperature range is not lower than substantially half a melting point of the metallic material and is lower than the melting point of the metallic material.

It is noted that the melting point is expressed in terms of absolute temperature. For example, where the melting point is 1500° C., a temperature substantially half the melting point is about 886.5 K (=1773 K/2).

The term "the material temperature is held within the temperature range" in the fifth machining condition is interpreted to mean a condition that is satisfied as long as an overall time-based average value of the material temperature after initiation of the machining of the hole 1 with the drill D and an overall surface-based average value of the material temperature in an entirety of the machined surface of the hole 1 over which a heat is distributed are both held in the temperature range.

That is, even if the material temperature at the machined surface measured immediately after the initiation of the machining of the hole 1 with the drill D is lower than a lower limit of the temperature range, the fifth machining condition is satisfied as long as the above-described time-based average value of the material temperature is eventually held in the temperature range.

Further, the workpiece W may be heated by heating means (for example, gas furnace and electric furnace) before the initiation of the machining of the hole 1 with the drill D. This facilitates the formation of the nanocrystal layer C2 and also softening of the workpiece W, reducing load applied to the drill D (machining tool) and a machining apparatus and accordingly making it possible to restrain their breakages.

Next, there will be described a result of the drilling operation with application of the above-described ultrafine crystal layer forming process. The workpiece W used in the drilling operation is constituted by a carbon steel (JIS-S55C), whose hardness is increased to about 7.8 GPa (800 Hv) by a hardening treatment.

Figure 8:
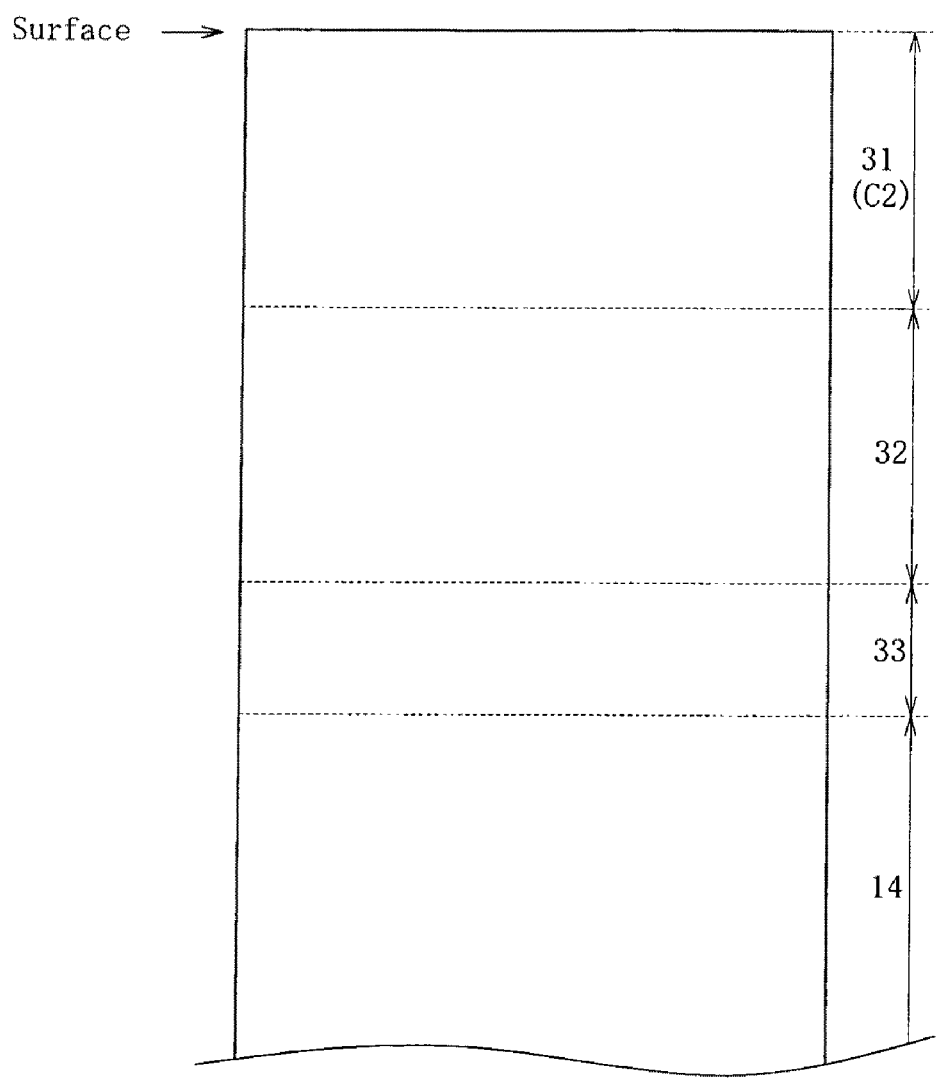
FIG. 8 A view showing a cross section of a structure of a portion of the workpiece surrounding a hole.

As a result of the formation of the hole 1 in the workpiece W with use of the drill D in accordance with the above-described fourth and fifth machining conditions, the nanocrystal layer C2 is formed in the inner circumferential surface of the hole 1, as shown in view (b) of FIG. 6. Referring now to FIG. 8, there will be described an outcome of detailed observation of the inner circumferential surface of the hole 1.

FIG. 8 is a cross sectional view showing a structure of a portion of the workpiece W surrounding the hole 1. In the inner circumferential surface of the hole 1, as shown in FIG. 8, there were observed a surface layer 31, a second layer 32 and a third layer 33 that are arranged in the order of description in a direction away from the inner circumferential surface (in a direction away from an upper side as seen in FIG. 8). It is noted that there was a non-machined region (region that is not influenced by the machining with the drill D) 14 located on a lower side of the third layer 33 (as seen in FIG. 8).

In the surface layer 31 defining the hole 1, there was observed the nanocrystal layer C2 in which its grain size was about 20 nm. In this nanocrystal layer C2, it was confirmed that its hardness was increased to 1150 Hv. It is considered that the surface layer 31 was heated to γ phase and had a large deformation (true strain of at least 7) so as to become fine γ grains during the drilling operation with the drill D, and that the nanocrystal layer C2 was formed as a result of diffusion transformation during cooling after the drilling operation.

In the second layer 32, there was observed an ultrafine crystal layer in which its grain size was about 100 nm. In this ultrafine crystal layer, it was confirmed that its hardness was increased to 1000 Hv. It is considered that the second layer 32 was recrystallized in α phase by heat applied thereto during the machining operation and then residue α was caused to have an island-like shape in a further heated phase, i.e., (α+γ) two-phases region, and that eventually solid solution γ containing carbon was transformed to (α+ martensite) during cooling. It is noted that a plastic deformation with true strain of not smaller than 1 (and smaller than 7) was imparted to the second layer 32.

In the fourth embodiment, a total of thickness values of the respective surface layer 31 and second layer 32 (depth as measured from the surface to a lower surface of the second layer 32) was about 10 μm. It was confirmed that the thickness values (depth) of such layers were increased with increase of the peripheral velocity V of the drill D. Further, it was confirmed that the thickness values (depth) of such layers were increased with increase of the diameter of the drill D where the peripheral velocity V of the drill D was constant.

The third layer 33 is considered as a region that was formed by a static recrystallization caused by heating up to about 700° C. during the drilling operation with the drill D (i.e., a region that was tempered upon thermal influence during the drilling operation). It is noted that the third layer 33 corresponds to "the non-nanocrystal layer which is provided by a lower layer portion of the machined surface" recited in the ninth aspect of the invention.

In the drilling operation (machining operation) by the drill D, it is preferable that the amount of supply of the cutting oil and the cutting condition (such as the peripheral velocity V and the feed amount of the drill D) are adjusted such that the material temperature at the machined surface is controlled to satisfy the above-described fifth machining condition and such that the material temperature at the third layer 33 is controlled to be about 500° C. or higher for a length of time that is not larger than about 1 second. Owing to this arrangement, the third layer 33 is restrained from being tempered, making it possible to assure the hardness and strength.

The drilling operation (machining operation) by the drill D is performed, preferably, such that a strain gradient of at least 1/μm is imparted to the surface layer portion of the machined surface. Owing to the strain gradient, the nanocrystal layer C2 can be further assuredly formed.

That is, with the strain gradient of 1/μm being imparted to the surface layer portion, a dislocation density becomes about $10^{16}$ per one square meter. Where the dislocation density becomes as high as such a degree, an energy required to cause the crystal to be fined becomes smaller than that required to cause a dislocation. Therefore, where a further strain (deformation) is imparted by the machining operation to the workpiece W in such a state, it is possible to induce a transition of the state of the workpiece, from its state in which the dislocation is caused, to its state in which the crystal is caused to be fined. Consequently, with the strain gradient of 1/μm being imparted to the surface layer portion, it is possible to assuredly form the nanocrystal layer C2.

Where a required value of the strain gradient is thus previously known, the cutting condition (e.g., cooling method, cutting speed, material hardness) may be adjusted based on the required value in the formation of the nanocrystal layer C2. Thus, the cutting condition can be determined in view of the strain gradient, so that the determination of the cutting condition can be made easily and efficiently, thereby making it possible to improve the operating efficiency.

It is noted that, prior to the drilling operation (machining operation) by the drill D, the workpiece W may be previously cooled, by causing the workpiece W to be immersed in a liquefied gas such as liquid nitrogen having an extremely low temperature. This enables a large temperature gradient to be imparted to the surface layer portion of the machined surface during the machining operation, facilitating the strain gradient of a predetermined value or larger to be imparted to the surface layer portion and assuredly forming the nanocrystal layer C2. This arrangement is effective, particularly, to a low hardness material (e.g., aluminum alloy) to which it is difficult to impart the strain gradient.

In the fourth embodiment, since the machining operation is the drilling operation performed by the drill D, principally, a shearing strain is caused in the surface layer portion of the machined surface. Thus, the strain of the above-described strain gradient refers to the shearing strain.

However, the strain gradient recited in the thirteenth aspect of the invention is not necessarily limited to the shearing strain, and is interpreted to encompass a compressive strain and a tensile strain in addition to the shearing stress. That is, in machining operations other than the drilling operation by the drill D, the strain (deformation) of the surface layer portion of the machined surface is different in form. Thus, in the other machining operations, there is a case where the strain of the surface layer portion principally corresponds to the compressive or tensile strain. In such a case, the "strain gradient of at least 1/μm" recited in the thirteenth aspect of the invention is interpreted to mean also the gradient of the compressive or tensile strain being of at least 1/μm".

It is noted that the material temperature at the machined surface during the drilling operation (machining operation) by the drill D is not particularly limited, as long as the drill operation can impart the strain gradient of at least 1/μm to the surface layer portion of the machined surface. This is because, even where the drilling operation does not satisfy the above-described fifth machining condition (that the material temperature at the machined surface is held within the predetermined temperature range), the nanocrystal layer C2 can be formed as long as the strain gradient of at least 1/μm can be imparted to the surface layer portion of the machined surface.

In this case, the nanocrystal layer forming process is defined as "a process of forming a nanocrystal layer in a surface layer portion of a surface of a workpiece constituted by a metallic material, by performing a machining operation on the surface of the workpiece using a machining tool, so as to impart a large local strain to the machined surface of the workpiece, the process being characterized in that: the machining operation using the machining tool is performed such that the machined surface of the workpiece is subjected to a plastic working that causes the machined surface of the workpiece to have a true strain of at least 7, and such that a strain gradient of at least 1/μm is imparted to the surface layer portion of the machined surface".

Figure 9:
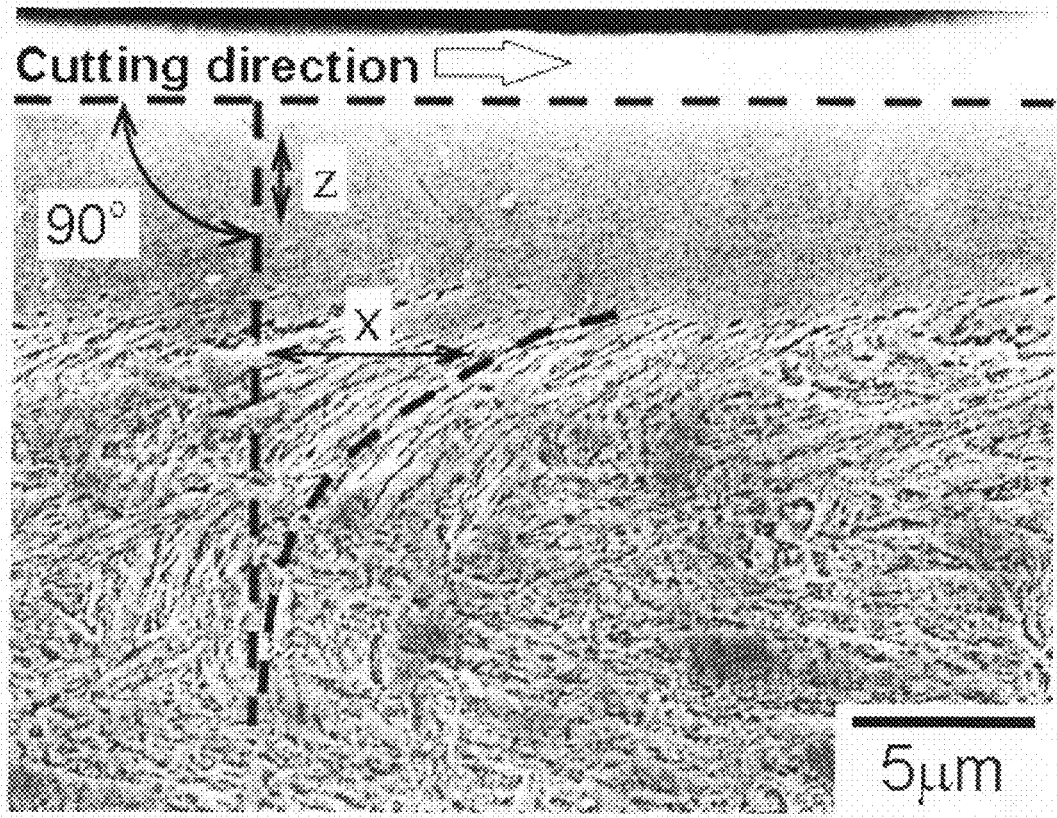
FIG. 9 A photograph view showing the cross section of the structure of the portion of the workpiece surrounding the hole.
Figure 10:
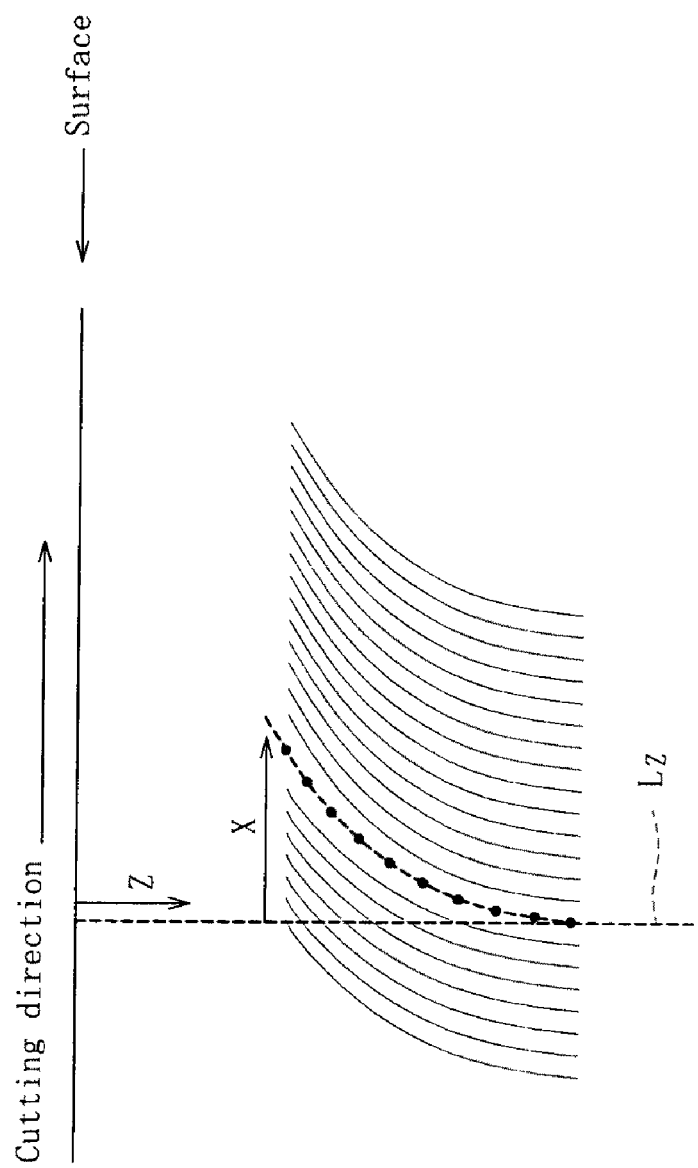
FIG. 10 A schematic view schematically showing the cross section of the structure of FIG. 9.
Figure 11A:
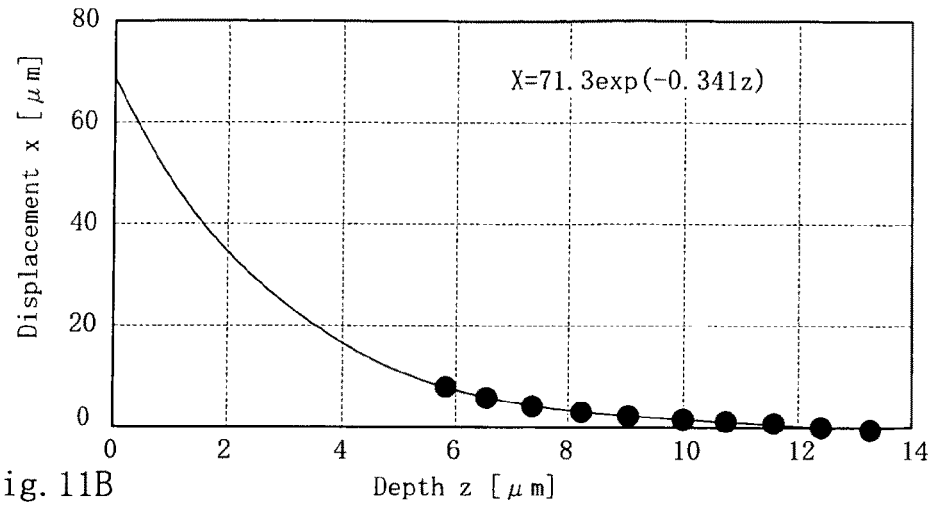
FIG. 11 A set of view wherein view (a) shows a relationship between a depth measured from the surface of the hole and a crystal displacement, view (b) shows a relationship between the depth and a shearing strain, and view (c) shows a relationship between the depth and a strain gradient.
Figure 11B:
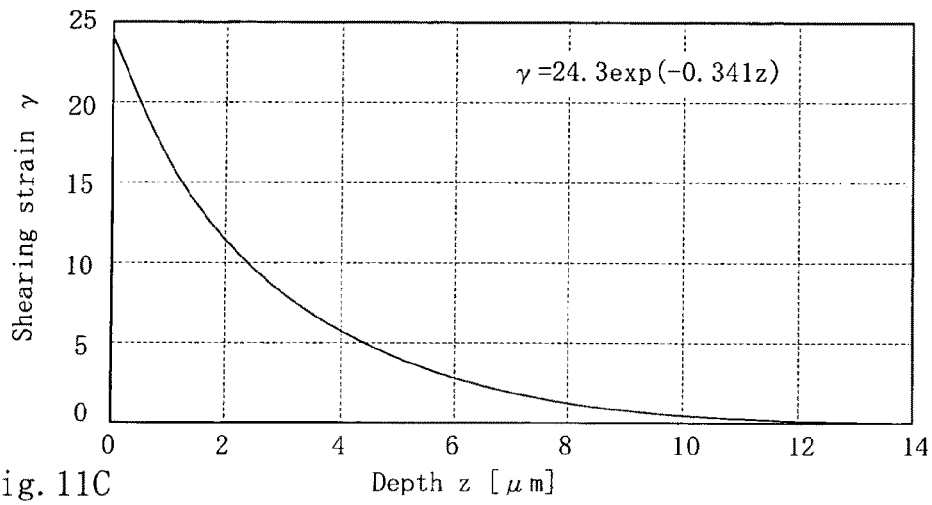
Figure 11C:
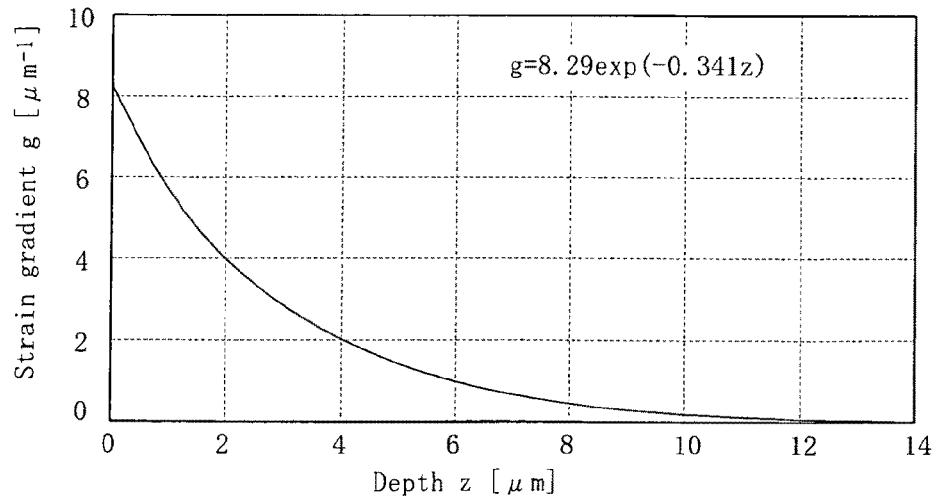

Referring next to FIGS. 9-11, there will be described a method of calculating the strain gradient. FIG. 9 is a photograph showing a cross section of a structure of a portion of the workpiece W surrounding the hole 1. FIG. 10 is a schematic view schematically showing the cross section of the structure of FIG. 9 so that the simplified view facilitates understanding of the structure. View (a) of FIG. 11 shows a relationship between a depth z measured from the surface of the hole 1 and a crystal displacement x. View (b) of FIG. 11 shows a relationship between the depth z and a shearing strain γ. View (c) of FIG. 11 shows a relationship between the depth z and a strain gradient g.

The cross section shown in FIGS. 9 and 10 is parallel to a feed direction of the drill D. A virtual line Lz is a virtual line perpendicular to a cutting direction. The depth z is measured along the virtual line Lz from the surface of the hole 1 as an original point. The displacement x is measured along a direction perpendicular to the virtual line Lz.

Before the drilling operation by the drill D, layer crystals are arranged (not shown) along the virtual line Lz in the workpiece W. When the drilling operation is performed by the drill D, each of the layer crystals is made largely curved in a sliding direction as shown in FIGS. 9 and 10. In this case, the curve (displacement x) of each of the layer crystals can be substantially expressed as an exponential function x (z) of the depth z.

As shown in FIGS. 9 and 19, with respect to each of a plurality of points (ten points from z=5.8 μm to z=13.2 μm in FIG. 10) of one of the layer crystals, the displacement x from its initial position (located on the virtual line Lz) before the drilling operation by the drill D is measured, and the measured value (displacement x) is plotted as the function of the depth z as shown in view (a) of FIG. 11. By the thus plotting the measured value, it is possible to obtain an approximation $x(z)=71.3\exp(-0.341z)$.

Then, by differentiating the approximation x(z) by the depth z, it is possible to obtain a function $\gamma(z)=24.3\exp(-0.341z)$, according to which the shearing strain γ can be obtained based on the depth z. According to the function γ(z), the shearing strain γ is maximized at the surface of the hole 1, and is largely reduced with increase of the depth z. Further, a true strain ε(z) can be obtained as a value corresponding to the shearing strain γ(z) divided by square root of 3.

Further, by differentiating the shearing strain γ(z) by the depth z, it is possible to obtain a function $g(z)=8.29\exp(-0.341z)$, according to which the strain gradient g can be obtained based on the depth z. That is, as shown in FIGS. 9 and 10, the strain gradient g at a predetermined depth position can be obtained through the exponential function as the approximation representative of the measured relationship between the depth z and the displacement x.

According to the function g (z), the strain gradient g at the surface of the hole 1 is g (0)=8.29. Supposing that the depth z of the formed nanocrystal layer C2 is about 6.0 as its average value (see FIG. 9), the strain gradient g at the depth (z=6.0) is g (6.0)=1.07. Thus, it was confirmed that imparting the strain gradient g of at least 1 is effective in the formation of the nanocrystal layer C2.

Next, there will be described an outcome of an annealing treatment performed on the workpiece W in which the nanocrystal layer C2 has been formed. It is noted that the annealing treatment was carried out with the workpiece W being held at a temperature of 600° C. in an ambient atmosphere for 1 hour.

In the workpiece W after the annealing treatment, the grain size of the nanocrystal layer C2 in the surface layer 11 was held in about 200 nm. Thus, in the nanocrystal layer C2, the crystal grains are difficult to be recrystallized even by the annealing treatment. That is, it was confirmed that the nanocrystal layer C2 is excellent in its temperature insensitivity.

Next, there will be described a result of a test for torsion fatigue strength, which was conducted in a case where the nanocrystal layer forming process according to the fourth embodiment was applied to production of an input shaft used in an automatic transmission. The input shaft is constituted by the material same as the above-described workpiece W, and is provided by a long shaft having a horizontal hole formed therein. The horizontal hole extends in an axial direction of the shaft and serves to introduce lubricant oil.

In an outer circumferential surface of the input shaft, there are formed a plurality of branch holes which are held in communication with the horizontal hole and through which the lubricant oil is to be supplied. The branch holes were formed in accordance with the above-described nanocrystal layer forming process. Thus, an inner circumferential surface of each branch hole is provided by the nanocrystal layer C2, and is accordingly provided with an improved hardness.

In the test, the torsion fatigue strength in a portion of the input shaft in which each branch was formed was 378653 times as its average value with application of torque of 392 Nm and was 95727 times as its average value with application of torque of 451 Nm. As compared with a conventional product without the nanocrystal layer C2 being provided in the inner circumferential surface of each branch hole, it was confirmed that the strength (torque ratio measured after torque applications about 90000 times) was increased by about 20%.

Figure 12:
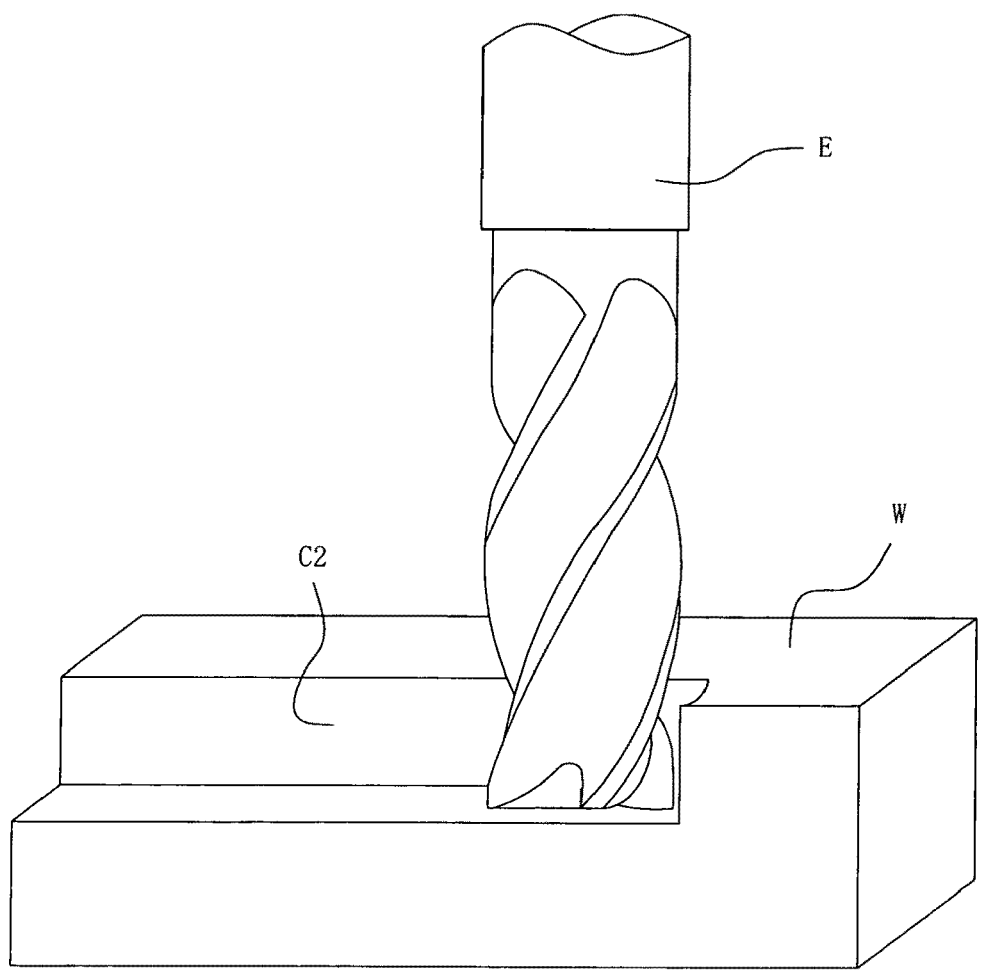
FIG. 12 A view explaining a nanocrystal layer forming process in a fifth embodiment, and is a perspective view of the workpiece during a cutting operation by an endmill.

Referring next to FIG. 12, there will be described a fifth embodiment of the invention. While the nanocrystal layer C2 is formed through the drilling operation using the drill D in the nanocrystal layer forming process according to the fourth embodiment, the nanocrystal layer C2 is formed through a cutting operation using an endmill E in the nanocrystal layer forming process according to the fifth embodiment. It is noted that the same reference signs as used in the above-described fourth embodiment will be used to identify the same portions, and description of the same portions will not be provided.

FIG. 12 is a view explaining the nanocrystal layer forming process in the fifth embodiment, and is a perspective view of the workpiece W during the cutting operation by the endmill E. It is noted that FIG. 12 does not show a holder holding the endmill E and transmitting a torque from a machining apparatus to the endmill E.

In the nanocrystal layer forming process in the fifth embodiment, as shown in FIG. 12, the cutting operation (machining operation) is performed by the endmill E on the workpiece W, satisfying the two i.e., fourth and fifth machining conditions as described above, whereby the nanocrystal layer C2 can be formed in the surface layer portion of the machined surface of the workpiece W.

Specifications of the workpiece W and the endmill E will be described. The workpiece is made of a carbon steel (JIS-SUJ2) as a material, and was subjected to a hardening as a heat treatment so as to have a hardness of 790 [Hv]. The endmill E is made of a cemented carbide as a material, coated with TiAlN coating and has a cutting diameter of φ 10 mm. The cutting operation by the endmill E was performed without using cutting oil, under a cutting condition with the peripheral velocity of 150 m/min, feed amount of 0.18 mm/rev, axial depth of cut of 2 mm and radial depth of cut of 0.1 mm.

As a result of the cutting operation performed on the workpiece W under the above-described cutting operation, the plastic working causing the true strain of at least 7 was imparted to the machined surface of the workpiece W (the above-described fourth machining condition), while the material temperature at the machined surface was increased to the Ac1 transformation point or higher (the above-described fifth machining condition), so that the nanocrystal layer C2 was formed in the machined surface.

As an outcome of detailed observation of the workpiece W after the cutting operation, it was confirmed that the nanocrystal layer C2 having a thickness of about 2.5 μm was formed in the workpiece W.

While the present invention has been described based on the fourth through fifth embodiments, it is to be easily imagined that the present invention is not at all limited to the details of the above-described embodiments but may be subjected to various improvements and modifications within a range that is not deviated from the gist of the invention.

For example, in the above-described fourth embodiment, there has been described, as a measure for assuring the strain gradient, the process of imparting the temperature gradient to the surface layer portion of the machined surface, namely, the process of performing the machining operation, after cooling the workpiece W by immersing the workpiece W in the in the liquefied gas having the extremely low temperature. However, it is not necessarily limited to such a process, and any other measures may be used.

For example, in a turning operation, there can be enumerated a measure for performing the turning operation (machining operation), after previously heating only the machined surface by irradiating laser light onto the machined surface. In this case, as in the above-described case, a larger temperature gradient can be imparted to the surface layer portion of the machined surface, facilitating the strain gradient to be imparted to the surface layer portion and assuredly forming the nanocrystal layer C2.

It is also preferable to impart a hardness gradient to the surface layer portion of the machined surface, for example, by performing a decarbonization treatment on the workpiece W. With the hardness gradient being imparted to the surface layer portion, as well as with the temperature gradient being imparted to the surface layer portion, establishment of the strain gradient is facilitated whereby the formation of the nanocrystal layer C2 can be assured.

Further, in the above-described fourth and fifth embodiments, there have been described, as examples of the machining operation for forming the nanocrystal layer C2, the drilling operation using the drill D and the cutting operation using the endmill E. However, the machining operation is not limited to any one of these machining operations, but may be other kind of machining operation which can satisfy both of the above-described fourth and fifth machining conditions.

As examples of the other kind of machining operation, there are a cutting operation such as a lathe operation using a lathe tool, a milling operation with a milling tool, a planing operation using a planing tool, and a gear hobbing operation using a hob; a grinding operation such as a finishing operation using a grinding tool; and an abrading operation such as a burnishing operation using a burnishing tool.

Further, while there has been described, as an example of the machine component having the nanocrystal layer C2, the input shaft for the automatic transmission in the above-described fourth embodiment, the machine component is necessarily neither the input shaft nor any one of the other components of an automotive vehicle. That is, the machine component may be any machine component, as long as it is constituted by a metallic material. As other machine component, there can be enumerated, for example, a structural component used for a construction.

In the above-described fourth and fifth embodiments, there have been described cases in each of which the workpiece W is constituted by the steel material. However, the workpiece W does not necessarily have to be constituted by the steel material, but may be constituted by any one of the other metallic materials other than the steel material. As the other metallic materials, there can be enumerated, for example, aluminum, magnesium, titanium, copper, and any combinations thereof. That is, the metallic material recited in any one of the eighth through thirteenth aspects of the invention is not limited to any one of the steel materials and metallic materials enumerated herein, but is interpreted to encompass various kinds of metallic materials.

Next, there will be described a sixth embodiment with reference to the accompany drawings. In the sixth embodiment, there will be described, as the nanocrystal layer forming process, a process of forming a nanocrystal layer in a machined surface layer portion of the workpiece by performing a drilling operation (machining operation) using a drill D (machining tool).

Figure 13A:
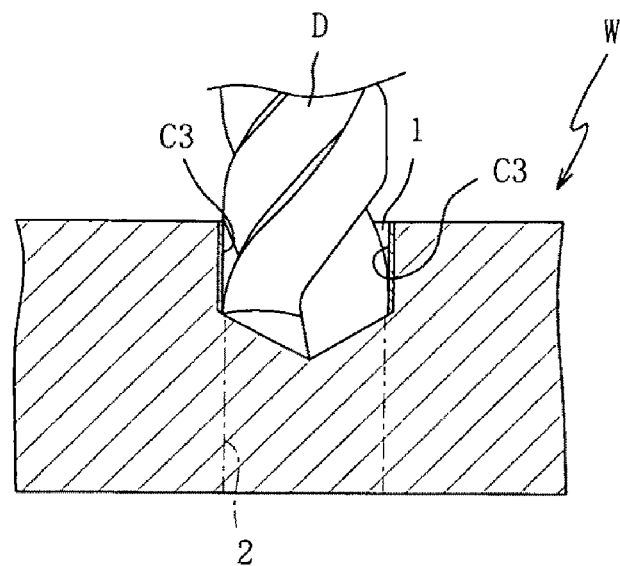
FIG. 13 A set of views explaining a nanocrystal layer forming process in a sixth embodiment, wherein view (a) is a cross section view of a workpiece when the workpiece is subjected to a drilling operation by a drill, and view (b) is a cross sectional view of the workpiece after the drilling operation.
Figure 13B:
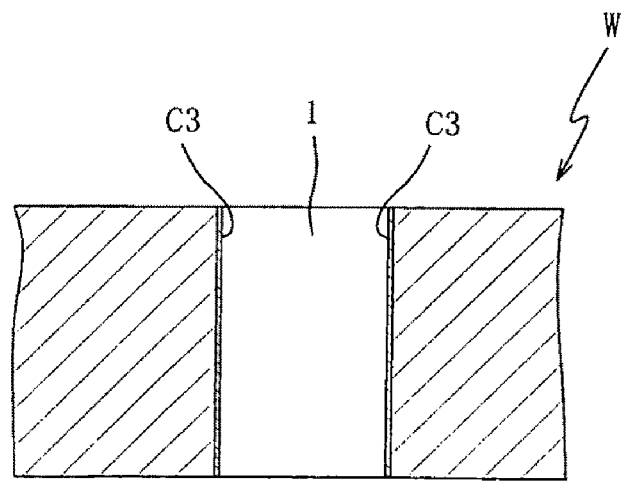

FIG. 13 is a set of views explaining the nanocrystal layer forming process in the sixth embodiment of the present invention, wherein view (a) is a cross section view of a workpiece W when the workpiece W is subjected to a drilling operation by the drill D, and view (b) is a cross sectional view of the workpiece W after the drilling operation. It is noted that parts of the drill D and the workpiece W are not shown in FIG. 13.

In the nanocrystal layer forming process in the sixth embodiment, the drilling operation is performed by the drill D so as to form a hole 1 in the workpiece W (see view (a) of FIG. 13), satisfying two i.e., sixth and seventh machining conditions as indicated below, whereby the nanocrystal layer C3 can be formed in an inner circumferential surface (surface layer portion of a machined surface) of the hole 1 (see view (b) of FIG. 13).

The sixth machining condition is provided by a condition that the inner circumferential surface of the hole 1 is subjected to a plastic working that causes the inner circumferential surface of the hole 1 to have a true strain of at least 7. This condition can be satisfied by performing the drilling operation in accordance with a cutting condition indicated by FIG. 14. It is noted that FIG. 14 is a view showing the sixth machining condition in the form of the cutting condition (cutting condition for forming the nanocrystal layer), as compared with a conventional cutting condition, wherein the abscissa indicates a hardness (Hv) of the workpiece W, while the ordinate indicates a peripheral velocity (m/min) of the drill D.

Figure 14:
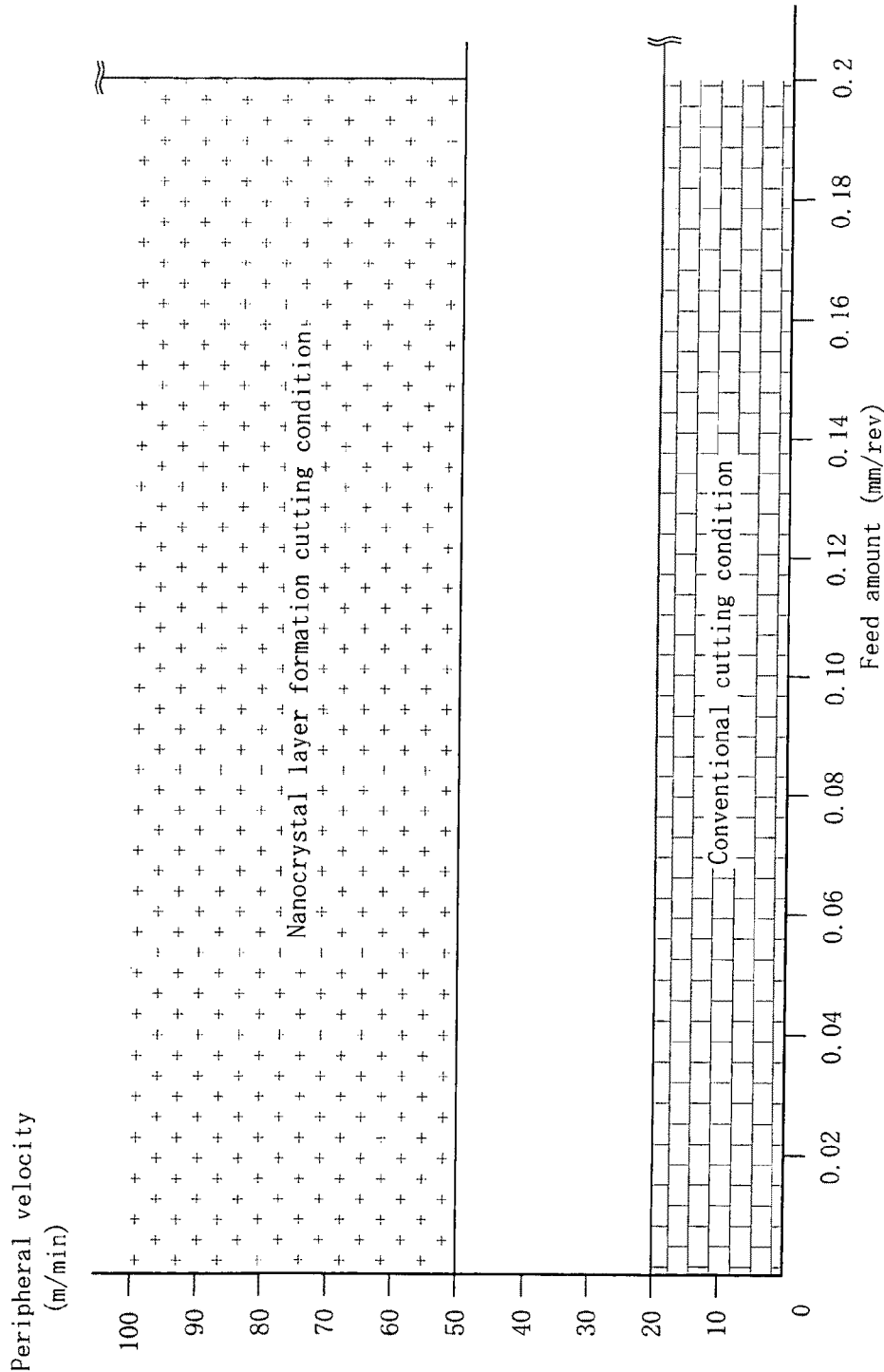
FIG. 14 A view showing a cutting condition as a sixth machining condition, as compared with a conventional cutting condition.

As shown in FIG. 14, the sixth machining condition is that the peripheral velocity V of the drill D is not lower than 50 m per minute with a feed amount of the drill D per one revolution thereof being not larger than 0.2 mm. By performing the drilling operation with the drill D in accordance with this sixth machining condition, it is possible to cause the inner circumferential surface of the hole 1 to be subjected to a plastic working that provides the inner circumferential surface with the true strain of at least 7.

It is preferable that the peripheral velocity V of the drill D is not lower than 75 m per minute with the feed amount of the drill D per one revolution thereof being not larger than 0.05 mm, so that the plastic working of the true strain of at least 7 can be further assuredly imparted to the inner circumferential surface of the hole 1.

The process may be initiated with formation of a prepared hole 2 (indicated by one-dot chain line in view (a) of FIG. 13) with a drill having a diameter that is smaller than a predetermined diameter. Then, the prepared hole 2 may be enlarged by the drill D or a reamer having diameter substantially equal to the predetermined diameter, so that the hole 1 is finished to have the predetermined diameter. The formation of the prepared hole 2 is made in accordance with the conventional cutting condition as shown in FIG. 14, while the finishing of the hole 1 with the drill D or the reamer is made in accordance with the sixth machining condition (cutting condition for forming the nanocrystal layer) as shown in FIG. 14.

The seventh machining condition is provided by a condition that a material temperature at the machined surface of the hole 1 is held lower than a predetermined temperature (hereinafter referred to as "upper limit temperature") during the drilling operation with the drill D. That is, by supplying cutting oil or the like to a machining portion, the material temperature at the machined surface is restrained from being increased.

Where the workpiece W is constituted by a steel material, the upper limit temperature is A1 and A3 transformation points of the steel material. Where the workpiece W is constituted by a metallic material other than the steel material, the upper limit temperature is substantially half a melting point of the metallic material. It is noted that the melting point is expressed in terms of absolute temperature. For example, where the melting point is 1500° C., a temperature substantially half the melting point is about 886.5 K (=1773 K/2).

The term "the material temperature is held lower than the upper limit temperature" in the seventh machining condition is interpreted to mean a condition that is satisfied as long as an overall time-based average value of the material temperature during the drilling operation of the hole 1 with the drill D and an overall surface-based average value of the material temperature in an entirety of the machined surface of the hole 1 over which a heat is distributed are both held lower than the upper limit temperature. That is, even if the material temperature at the machined surface is increased to be momentarily or locally higher than the upper limit temperature, the seventh machining condition is satisfied as long as the above-described overall time-based and overall surface-based average values of the material temperature are held lower than the upper limit temperature.

Next, there will be described a result of the drilling operation with application of the above-described nanocrystal layer forming process. The workpiece W used in the drilling operation is constituted by an alloy steel (JIS-SCM420H), and has a surface that is hardened by a heat treatment such as carbonized hardening process. It is noted that the hardness of the workpiece W is about 6.8 GPa (700 Hv) as measured at its surface, and is about 3.4 GPa (350 Hv) as measured at its inner portion.

As a result of the formation of the hole 1 performed by using the drill D in accordance with the above-described sixth and seventh machining conditions, the nanocrystal layer C3 is formed in the inner circumferential surface of the hole 1, as shown in view (b) of FIG. 13. In a detailed observation of the formed nanocrystal layer C3, it was confirmed that the grain size was about 100 nm (0.1 μm) and the hardness was increased to 9.8 GPa (980 Hv). It is noted that a surface roughness Ra of the nanocrystal layer C3 was 0.7.

Next, there will be described a result of a test for torsion fatigue strength, which was conducted in a case where the nanocrystal layer forming process according to the sixth embodiment was applied to production of an input shaft used in an automatic transmission. The input shaft is constituted by the material same as the above-described workpiece W, and is provided by a long shaft having a horizontal hole formed therein. The horizontal hole extends in an axial direction of the shaft and serves to introduce lubricant oil.

In an outer circumferential surface of the input shaft, there are formed a plurality of branch holes which are held, in communication with the horizontal hole and through which the lubricant oil is to be supplied. The branch holes were formed in accordance with the above-described nanocrystal layer forming process. Thus, an inner circumferential surface of each branch hole is provided by the nanocrystal layer, and is accordingly provided with an improved hardness.

In the test, the torsion fatigue strength in a portion of the input shaft in which each branch was formed was 378653 times as its average value with application of torque of 392 Nm and was 95727 times as its average value with application of torque of 451 Nm. As compared with a conventional product without the nanocrystal layer being provided in the inner circumferential surface of each branch hole, it was confirmed that the strength (torque ratio measured after torque applications about 90000 times) was increased by about 20%.

Figure 15B:
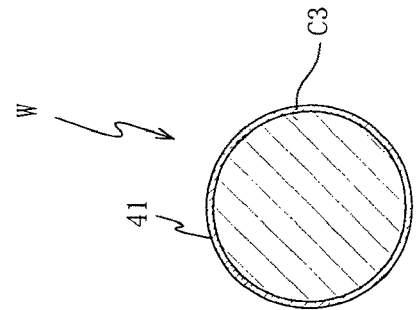
FIG. 15 A set of views explaining a nanocrystal layer forming process in a seventh embodiment, wherein view (a) is a perspective view of the workpiece during a slide machining operation by a pressing tool P, while view (b) is a transverse cross-sectional view of the workpiece taken along line 15(b)-15(b) in view (a).
Figure 15A:
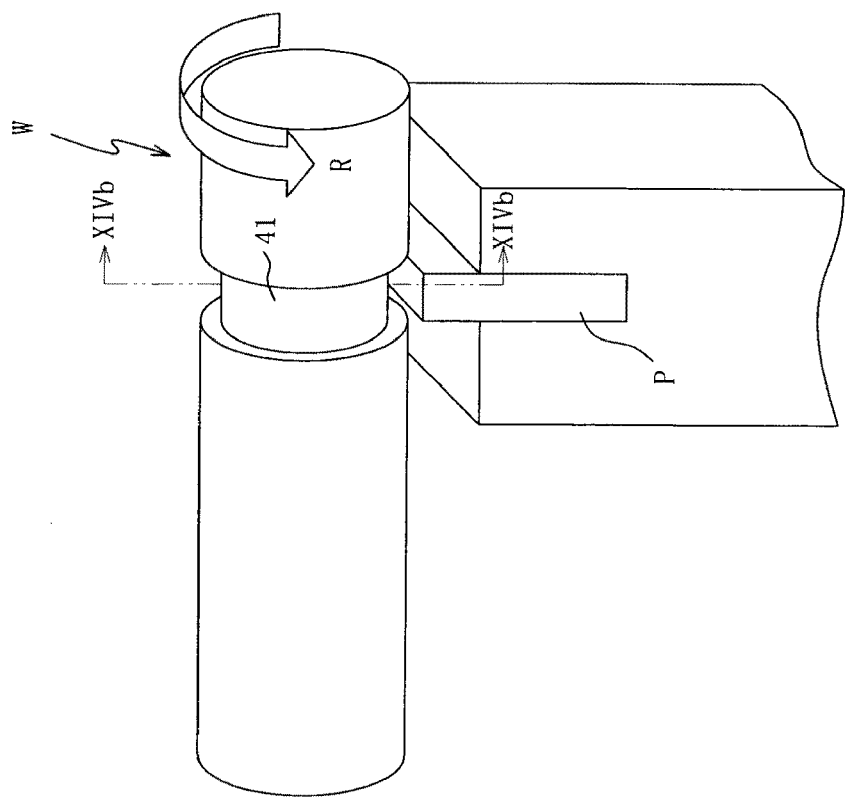
Figure 16:
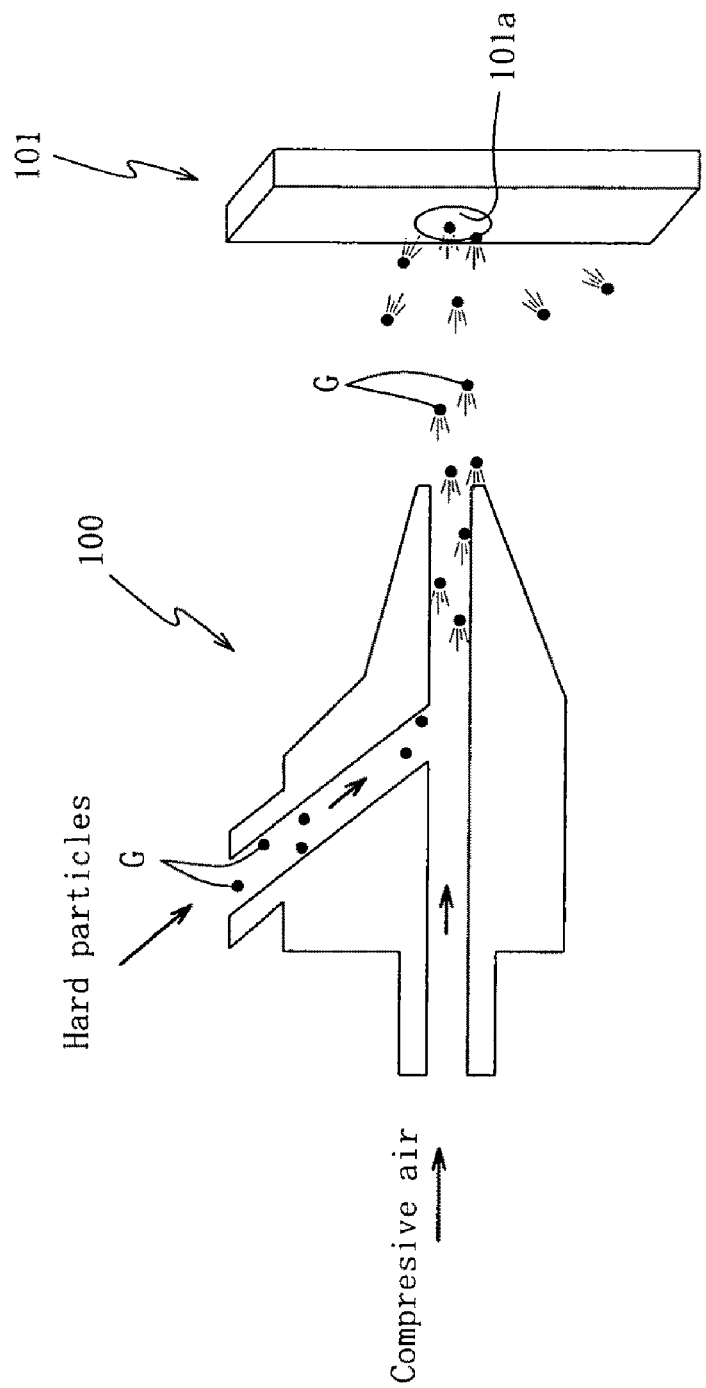
FIG. 16 A schematic view showing a conventional nanocrystal layer or the like forming process (shot peening).

Referring next to FIG. 15, there will be described a seventh embodiment of the invention. While the nanocrystal layer is formed through the drilling operation using the drill D in the nanocrystal layer forming process according to the sixth embodiment, the nanocrystal layer is formed through a slide machining operation using a pressing tool P. It is noted that the same reference signs as used in the above-described sixth embodiment will be used to identify the same portions, and description of the same portions will not be provided.

FIG. 15 is a set of views explaining the nanocrystal layer forming process in the seventh embodiment, wherein view (a) is a perspective view of the workpiece W during the slide machining operation by the pressing tool P, while view (b) is a transverse cross-sectional view of the workpiece W taken along line XIVb-XIVb in view (a). It is noted that, in view (a) of FIG. 15, there is not shown a holder holding the workpiece W and transmitting a torque from a lathe to the workpiece W. Further, view (b) of FIG. 15 shows a transverse cross section of the workpiece W after the slide machining operation by the pressing tool P.

According to the nanocrystal layer forming process in the seventh embodiment, the nanocrystal layer C3 can be formed in the surface layer portion (surface layer portion of the machined surface) of an outer circumferential surface 41 (see view (b) of FIG. 15), by performing the slide machining operation (machining operation) on the workpiece W with the pressing tool P (machining tool), satisfying the above-described sixth and seventh machining conditions (see view (a) of FIG. 15).

The slide machining operation is a machining operation in which the pressing tool P is pressed, by a predetermined pressure, against the outer circumferential surface 41 of the workpiece W while the workpiece W is being rotated (in a direction indicated by arrow R as shown in view (a) of FIG. 15), whereby the outer circumferential surface 21 of the workpiece W is slid on the pressing tool P, so as to be subjected to a plastic working.

Specifications of the workpiece W and the pressing tool P will be described. The workpiece is made of a carbon steel (JIS-S10C) as a material. The outside diameter of the machined outer circumferential surface 41 is φ 10 mm. The pressing tool P is made of a tool steel (JIS-SKD61) as a material, and has a hardness of 8.3 GPa (850 Hv) and a width (as measured in a horizontal direction as seen in view (a) of FIG. 15) of 5 mm.

In the formation of the nanocrystal layer, it is necessary that a surface pressure of the pressing tool P is at least 100 MPa and a length of time for the slide machining operation is at least 3 minutes, for satisfying the above-described sixth machining condition (condition required for imparting the plastic working of the true strain of at least 7). However, the rotation speed of the workpiece W is not particularly limited.

It is preferable that the rotation speed of the workpiece W is at least 25 revolutions per minute, the surface pressure of the pressing tool P is at least 400 MPa, the length of time for the slide machining operation is at least 5 minutes, and an amount of supply of coolant (e.g., methanol) is about 50 ml per minute, so that the plastic working of the true strain of at least 7 can be further assuredly imparted to the machined outer circumferential surface 41.

Next, there will be described a result of the slide machining operation with application of the nanocrystal layer forming process according to the seventh embodiment. As a result of the slide machining operation performed on the outer circumferential surface 41 with use of the pressing tool P satisfying the above-described sixth and seventh machining conditions, as shown in view (a) of FIG. 15, the nanocrystal layer C3 is formed in the outer circumferential surface 41, as shown in view (b) of FIG. 15.

In a detailed observation of the workpiece W after the slide machining operation, it was confirmed that the hardness in an inner portion in which the nanocrystal layer C3 was not formed was 3.9 GPa (400 Hv) while the hardness in the nanocrystal layer C3 was increased to 7.0 GPa (720 Hv).

Further, there will be described an outcome of an annealing treatment performed on the workpiece W in which the nanocrystal layer C3 has been formed. It is noted that the annealing treatment was carried out with the workpiece W being held at a temperature of 600° C. in an ambient atmosphere for 1 hour.

In the workpiece W after the annealing treatment, the hardness in the inner portion in which the nanocrystal layer C3 was not formed was 1.5 GPa (155 Hv), while the hardness in the nanocrystal layer C3 was 3.9 GPa (400 Hv), namely, was kept high. Thus, the crystal grains in the nanocrystal layer C3 are difficult to be recrystallized even by the annealing treatment, so that the nanocrystal layer C3 is excellent in its temperature insensitivity. Therefore, by applying the nanocrystal layer forming process of the seventh embodiment to a sliding surface of a rotary shaft, it is possible to improve a wear resistance of the sliding surface and accordingly to lengthen a life of the rotary shaft.

As described above, in the nanocrystal layer forming process of the present invention, by performing the machining operation (the drilling operation or the slide machining operation) on the workpiece W using the drill D or the pressing tool P, the nanocrystal layer C3 is formed in the machined surface (the inner circumferential surface of the hole 1 or the machined outer circumferential surface 41). Thus, it is possible to form the nanocrystal layer C3 even in a portion in which the nanocrystal layer C3 could not be formed by the conventional nanocrystal layer forming process using the shot peening or the like. Further, the nanocrystal layer C3 can be stably formed, and the formed nanocrystal layer C3 can be homogeneous.

Further, in the nanocrystal layer forming process of the present invention, unlike the conventional nanocrystal layer forming process, there is no need of additional provision of special installations such as an ejection device 100 (see FIG. 4) for shot peening, thereby making it possible to restrain a cost required for the installations. Further, in a product producing process, it is possible to minimize modifications of the process required for formation of the nanocrystal layer C3, leading to reduction in a cost required for the formation of the nanocrystal layer and the consequent reduction in a cost required for the production of the product.

For example, in the example of the sixth embodiment, since the nanocrystal layer C3 is formed concurrently with the formation of the hole 1 by the drill D, there is no need to add a step for forming the nanocrystal layer C3. Further, in the example of the seventh embodiment, the nanocrystal layer C3 can be formed after the outer circumferential surface 41 is cut by a lathe tool, by simply replacing the lathe tool with the pressing tool P, namely, by keeping the workpiece W to be held by the holder, so that modifications of the required process can be minimized.

Further, in the conventional nanocrystal layer forming process, where the nanocrystal layer C3 is to be formed over a wide area, the collision of the protrusion or the hard particles G (see FIG. 4) has to be repeated a plurality of times, thereby increasing a required forming time and resulting in inefficiency in the formation of the nanocrystal layer. On the other hand, in the nanocrystal layer forming process of the present invention, since the nanocrystal layer C3 is formed by performing the machining operation (the drilling operation or the slide machining operation) using the drill D or the pressing toll P, it is possible to efficiently form the nanocrystal layer C3, leading to the consequent reduction in the cost for the formation of the nanocrystal layer C3.

While the present invention has been described based on the sixth and seventh embodiments, it is to be easily imagined that the present invention is not at all limited to the details of the above-described embodiments but may be subjected to various improvements and modifications within a range that is not deviated from the gist of the invention.

For example, in the above-described sixth and seventh embodiments, there have been described, as examples of the machining operation for forming the nanocrystal layer, the drilling operation using the drill D and the slide machining operation using the pressing tool P. However, the machining operation is not limited to any one of these machining operations, but may be other kind of machining operation which can satisfy both of the above-described sixth and seventh machining conditions.

As examples of the other kind of machining operation, there are a cutting operation such as a lathe operation using a lathe tool, a milling operation with a milling tool, a planing operation using a planing tool, and a gear hobbing operation using a hob; a grinding operation such as a finishing operation using a grinding tool; and an abrading operation such as a burnishing operation using a burnishing tool.

Further, while there has been described, as an example of the machine component having the nanocrystal layer C3, the input shaft for the automatic transmission in the above-described sixth embodiment, the machine component is necessarily neither the input shaft nor any one of the other components of an automotive vehicle. That is, the machine component may be any machine component, as long as it is constituted by a metallic material. As other machine component, there can be enumerated, for example, a structural component used for a construction.

In the above-described sixth and seventh embodiments, there have been described cases in each of which the workpiece W is constituted by the steel material. However, the workpiece W does not necessarily have to be constituted by the steel material, but may be constituted by anyone of the other metallic materials other than the steel material. As the other metallic materials, there can be enumerated, for example, aluminum, magnesium, titanium, copper, and any combinations thereof. That is, the metallic material recited in any one of the eighth through thirteenth aspects of the invention is not limited to any one of the steel materials and metallic materials enumerated herein, but is interpreted to encompass various kinds of metallic materials.

The invention claimed is:

1. A nanocrystal layer forming process of forming a nanocrystal layer in a workpiece constituted by a metallic non-steel material, said process comprising:
performing a machining operation on a surface of the workpiece using a machining tool, so as to impart a large local strain to the machined surface of the workpiece, such that said nanocrystal layer is formed in a surface layer portion of the workpiece that defines the machined surface of the workpiece;
wherein the machining operation using the machining tool causes the machined surface of the workpiece to be subjected to a plastic working that causes the machined surface of the workpiece to have said large local strain in the form of a true strain of at least 7;
and wherein said machining operation is performed on the surface of the workpiece, with a material temperature at the machined surface of the workpiece being held in a range which is not lower than half a melting point of the non-steel material and is lower than the melting point of the non-steel material, where said material temperature and said melting point are expressed in terms of absolute temperature.

2. A nanocrystal layer forming process of forming a nanocrystal layer in a workpiece constituted by a metallic steel material, said process comprising:
performing a machining operation on a surface of the workpiece using a machining tool, so as to impart a large local strain to the machined surface of the workpiece, such that said nanocrystal layer is formed in a surface layer portion of the workpiece that defines the machined surface of the workpiece;
wherein the machining operation using the machining tool causes the machined surface of the workpiece to be subjected to a plastic working that causes the machined surface of the workpiece to have said large local strain in the form of a true strain of at least 7;
wherein said machining operation is performed on the surface of the workpiece, with a material temperature at the machined surface of the workpiece being held in a range which is not lower than an Ac1 transformation point of the steel material and which is lower than a melting point of the steel material;
wherein the machining operation using the machining tool is performed such that a material temperature at a non-nanocrystal layer is held at least 500° C. for a length of time that is not larger than one (i) second, for providing the non-nanocrystal layer with a hardness that is 80% as high as a hardness of a substrate of the workpiece;
and wherein the non-nanocrystal layer is provided by at least one of (i) a lower layer portion that is located on an inner side of the surface layer portion as a machined surface layer portion and (ii) another surface layer portion that is located on the machined surface layer portion.

3. A nanocrystal layer forming process of forming a nanocrystal layer in a workpiece constituted by a metallic non-steel material, said process comprising:
performing a machining operation on a surface of the workpiece using a machining tool, so as to impart a large local strain to the machined surface of the workpiece, such that said nanocrystal layer is formed in a surface layer portion of the workpiece that defines the machined surface of the workpiece;

wherein the machining operation using the machining tool causes the machined surface of the workpiece to be subjected to a plastic working that causes the machined surface of the workpiece to have said large local strain in the form of a true strain of at least 7;

and wherein said machining operation using said machining tool is performed on the surface of the workpiece, with a material temperature at the machined surface of the workpiece being held not higher than an upper limit temperature that corresponds to half a melting point of the non-steel material, where said material temperature and said melting point are expressed in terms of absolute temperature.

4. The nanocrystal layer forming process according to claim 1, wherein the machining operation using the machining tool is performed such that a material temperature at a non-nanocrystal layer is held at least 500C.° for a length of time that is not larger than one (1) second, for providing the non-nanocrystal layer with a hardness that is 80% as high as a hardness of a substrate of the workpiece, and wherein the non-nanocrystal layer is provided by at least one of (i) a lower layer portion that is located on an inner side of the surface layer portion as a machined surface layer portion and (ii) another surface layer portion that is located on the machined surface layer portion.

5. The nanocrystal layer forming process according to claim 2, wherein an overall time-based average value of the material temperature during the machining operation and an overall surface-based average value of the material temperature in an entirety of the machined surface are not higher than a melting point of the steel material.

6. The nanocrystal layer forming process according to claim 3, wherein an overall time-based average value of the material temperature during the machining operation and an overall surface-based average value of the material temperature in an entirety of the machined surface are not higher than said upper limit temperature.

7. The nanocrystal layer forming process according to claim 1, wherein the machining operation using the machining tool is performed such that a strain gradient of at least 1/μm imparted to the surface layer portion.

8. The nanocrystal layer forming process according to claim 2, wherein the machining operation using the machining tool is performed such that a strain gradient of at least 1/μm imparted to the surface layer portion.

9. The nanocrystal layer forming process according to claim 2, wherein said machining operation is performed by moving one of the machining tool and the workpiece relative to the other of the machining tool and the workpiece in a direction that causes the surface of the workpiece to be machined by the machining tool, while one of the machining tool and the workpiece is being rotated.

10. The nanocrystal layer forming process according to claim 1, wherein said machining operation is performed by moving one of the machining tool and the workpiece relative to the other of the machining tool and the workpiece in a direction that causes the surface of the workpiece to be machined by the machining tool, while one of the machining tool and the workpiece is being rotated.

* * * * *